United States Patent
Jagnanan et al.

(10) Patent No.: US 11,993,751 B2
(45) Date of Patent: May 28, 2024

(54) PREDICTIVE CONTROL SYSTEMS AND METHODS WITH FLUID CATALYTIC CRACKING VOLUME GAIN OPTIMIZATION

(71) Applicant: Imubit Israel Ltd., Modiin (IL)

(72) Inventors: Janelle Jagnanan, Houston, TX (US); Joseph Von Edwins, Houston, TX (US); Matthew Stephens, Houston, TX (US); Kevin Clarke, Houston, TX (US); Nadav Cohen, Yavne (IL)

(73) Assignee: Imubit Israel Ltd., Modiin (IL)

( * ) Notice: Subject to any disclaimer, the term of this patent is extended or adjusted under 35 U.S.C. 154(b) by 501 days.

(21) Appl. No.: 17/308,474

(22) Filed: May 5, 2021

(65) Prior Publication Data

US 2021/0253956 A1 Aug. 19, 2021

Related U.S. Application Data

(63) Continuation-in-part of application No. 16/950,643, filed on Nov. 17, 2020, and a continuation-in-part of
(Continued)

(51) Int. Cl.
*C10G 11/18* (2006.01)
*B01J 8/00* (2006.01)
(Continued)

(52) U.S. Cl.
CPC ............ *C10G 11/187* (2013.01); *B01J 8/0025* (2013.01); *B01J 8/0035* (2013.01); *B01J 8/1809* (2013.01);
(Continued)

(58) Field of Classification Search
CPC ..... C10G 11/187; B01J 8/0025; B01J 8/0035; B01J 8/1809; B01J 8/1836; B01J 8/24; G06N 3/04; G06N 3/08
(Continued)

(56) References Cited

U.S. PATENT DOCUMENTS 4,176,052 A 11/1979 Bruce et al.
4,374,021 A 2/1983 Bartholic
(Continued)

FOREIGN PATENT DOCUMENTS

SU 844626 A1 7/1981
WO WO-2021/025841 A1 2/2021

OTHER PUBLICATIONS

International Search Report and Written Opinion on PCT/US23/22036 dated Aug. 4, 2023.
(Continued)

*Primary Examiner* — Allen C Wong
(74) *Attorney, Agent, or Firm* — Foley & Lardner LLP

(57) ABSTRACT

A control system for automatic operation of a fluid catalytic cracking unit is shown. The control system includes a reactor severity control device operable to modulate a temperature affecting volume gain within the fluid catalytic cracking unit and a controller. The controller includes a processing circuit configured to calculate the volume gain within the fluid catalytic cracking unit by comparing a volume based on one or more input oil feeds to the fluid catalytic cracking unit to a volume of one or more output oil products of the fluid catalytic cracking unit. The processing circuit is further configured to use a neural network model to generate a target severity predicted to optimize the volume gain within the fluid catalytic cracking unit. The processing circuit is further configured to operate the reactor severity control device using the target severity to modulate the temperature affecting the volume gain within the fluid catalytic cracking unit.

23 Claims, 18 Drawing Sheets

Related U.S. Application Data application No. 16/888,128, filed on May 29, 2020, now Pat. No. 11,494,651, which is a continuation-in-part of application No. 15/883,114, filed on Jan. 30, 2018, now Pat. No. 11,200,489, said application No. 16/950,643 is a continuation-in-part of application No. 15/883,114, filed on Jan. 30, 2018, now Pat. No. 11,200,489.

(51) Int. Cl.
   *B01J 8/18*           (2006.01)
   *B01J 8/24*           (2006.01)
   *G06N 3/04*          (2023.01)
   *G06N 3/08*          (2023.01)

(52) U.S. Cl.
   CPC ............... *B01J 8/1836* (2013.01); *B01J 8/24* (2013.01); *G06N 3/04* (2013.01); *G06N 3/08* (2013.01)

(58) Field of Classification Search
   USPC .......................................... 208/113
   See application file for complete search history.

(56) References Cited

U.S. PATENT DOCUMENTS

| | | |
|---|---|---|
| 5,311,421 A | 5/1994 | Nomura et al. |
| 5,825,646 A | 10/1998 | Keeler et al. |
| 6,246,972 B1 | 6/2001 | Klimasauskas |
| 7,720,641 B2 | 5/2010 | Alagappan et al. |
| 9,690,312 B2 | 6/2017 | Steven et al. |
| 2002/0059202 A1 | 5/2002 | Hadzikadic et al. |
| 2003/0108244 A1 | 6/2003 | Li et al. |
| 2006/0178762 A1 | 8/2006 | Wroblewski et al. |
| 2007/0156288 A1 | 7/2007 | Wroblewski et al. |
| 2007/0168328 A1 | 7/2007 | Peralta et al. |
| 2010/0050025 A1 | 2/2010 | Grichnik et al. |
| 2012/0053762 A1 | 3/2012 | Stiefenhofer et al. |
| 2015/0094201 A1* | 4/2015 | Janssen ............... B01J 38/30 502/38 |
| 2015/0185717 A1 | 7/2015 | Sayyar-Rodsari et al. |
| 2015/0379429 A1 | 12/2015 | Lee et al. |
| 2016/0048113 A1 | 2/2016 | Pandurangan et al. |
| 2016/0258361 A1 | 9/2016 | Tiwari et al. |
| 2017/0061249 A1* | 3/2017 | Estrada ................ G06V 10/454 |
| 2017/0139423 A1 | 5/2017 | El Ferik et al. |
| 2017/0183573 A1 | 6/2017 | Arora et al. |
| 2018/0016503 A1* | 1/2018 | Prasad ................... C10G 9/005 |
| 2018/0275692 A1* | 9/2018 | Lattanzio ................ G01K 3/14 |
| 2019/0236447 A1 | 8/2019 | Cohen et al. |
| 2020/0074486 A1 | 3/2020 | Motohashi et al. |
| 2020/0311547 A1 | 10/2020 | Mukund et al. |
| 2020/0355391 A1 | 11/2020 | Wenzel et al. |
| 2021/0096518 A1 | 4/2021 | Ilani et al. |
| 2021/0253956 A1 | 8/2021 | Jagnanan et al. |
| 2021/0348066 A1 | 11/2021 | Clark et al. |

OTHER PUBLICATIONS

International Search Report and Written Opinion issued in PCT/US2022/015474 dated May 12, 2022.
International Search Report and Written Opinion issued on PCT/US2021/030723 dated Jul. 28, 2021.
Nguyen et al., "Multiple neural networks for a long term time series forecast", Neural Computing & Applic (2004) 13:90-98 (Year: 2004).
Lawrynczuk, "Predictive Control of a Distillation Column Using a Control-Oriented Neural Model," Icannga, 2011, part 1, pp. 230-239.
Lawrynczuk, "Neural Dynamic Matrix Control Algorithm with Disturbance Compensation," IEA/AIE, 2010, part 3, pp. 52-61.
International Search Report and Written Opinion on PCT/IB2021/057421 dated Nov. 4, 2021.
International Search Report and Written Opinion issued in PCT/US2022/024645 dated Jul. 1, 2022.
Chang A I et al.: "Advanced control project stabilizes delayed coker, increases throughput", Oil and Gas Journal, Pennwell, Houston, TX, US vol. 99, No. 34 Aug. 20, 2001 (Aug. 8, 2001), pp. 52-56.
Extended European Search Report issued in EP application No. 21813354.4 dated Nov. 20, 2023.
Yu, et al., "Implementation of neural network predictive control to a multivariable chemical reactor", Control Engineering Practice 11 92003) 1315-1323 (Year: 2003).
Zahedi Gholamreza et al.: A Neural Network Approach for Identification and Modeling of Delayed Coking Plant:, International Journal of Chemical Reactor Engineering, [Online] vol. 7, No. 1, May 6, 2009.

* cited by examiner ately used by the control system. In some embodiments, the neural network model includes a gain neural network model and the processing circuit is configured to train the gain neural network model by initializing the gain neural network model with an initial set of weights, using the gain neural network model to predict the volume gain based on a plurality of sets of values for one or more manipulated variables provided as inputs to equipment of the fluid catalytic cracking unit, identifying a particular set of the plurality of sets of values for which the gain neural network model predicts a maximum volume gain, and adjusting the weights of the gain neural network model to increase the maximum volume gain predicted by the gain neural network model.

PREDICTIVE CONTROL SYSTEMS AND METHODS WITH FLUID CATALYTIC CRACKING VOLUME GAIN OPTIMIZATION

CROSS-REFERENCE TO RELATED PATENT APPLICATIONS

This application is a continuation-in-part of U.S. patent application Ser. No. 16/888,128 filed May 29, 2020, which is a continuation-in-part of U.S. patent application Ser. No. 15/883,114 filed Jan. 30, 2018. This application is also a continuation-in-part of U.S. patent application Ser. No. 16/950,643 filed Nov. 17, 2020, which is a continuation-in-part of U.S. patent application Ser. No. 15/883,114 filed Jan. 30, 2018. The entire disclosures of each of these patent applications are incorporated by reference herein.

BACKGROUND

The present disclosure relates generally to control systems and more particularly to control systems including a neural network system to optimize oil refinery processes.

Neural networks are a type of artificial intelligence that are generally inspired by biological neural networks. Neural networks can include a collection of connected nodes, wherein the connections of the nodes are modeled as weights. The inputs to a neural network may be modified by these weights and summed, producing an output layer that indicates a particular prediction or determination. Adjustment of the weights effects the output layer of the neural network, thus affecting its learning process.

Neural network-based control systems can be used to monitor and control a wide variety of systems and processes including, for example, a petroleum refinery system, a natural gas processing plant, a liquefied natural gas (LNG) production facility, an olefin manufacturing plant, a commodity chemical manufacturing plant, a polymer production system, a renewable fuel production facility, an ammonia complex processing system, and many other types of industrial, production, or processing systems. Training a neural network typically includes applying a set of training data that represents the behavior of the system to the neural network and tuning the neural network to predict the system behavior reflected by the training data. However, it can be challenging to properly train and apply a neural network to a dynamic system that behaves differently at different points in time.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a control system for automatic operation of a fluid catalytic cracking unit. The control system includes a reactor severity control device operable to modulate a temperature affecting volume gain within the fluid catalytic cracking unit. The control system further includes a controller including a processing circuit configured to calculate the volume gain within the fluid catalytic cracking unit by comparing a volume based on one or more input oil feeds to the fluid catalytic cracking unit to a volume of one or more output oil products of the fluid catalytic cracking unit. The processing circuit is further configured to use a neural network model to generate a target severity predicted to optimize the volume gain within the fluid catalytic cracking unit. The processing circuit is further configured to operate the reactor severity control device using the target severity to modulate the temperature affecting the volume gain within the fluid catalytic cracking unit.

In some embodiments, the reactor severity control device is configured to modulate the temperature affecting the volume gain by controlling a catalyst reaction within a reactor of the fluid catalytic cracking unit within which the one or more input oil feeds are converted into the one or more output oil products. In some embodiments, the temperature affecting the volume gain within the fluid catalytic cracking unit is a reactor temperature within the reactor.

In some embodiments, the reactor severity control device is a heating element configured to apply heat to a feed of one or more of the input oil feeds before the one or more of the input oil feeds enter the fluid catalytic cracking unit. In some embodiments, the temperature affecting the volume gain within the fluid catalytic cracking unit is a preheat temperature of the one or more input oil feeds.

In some embodiments, the processing circuit is configured to use the neural network model to predict a volume of each output oil product of the one or more output oil products predicted to result from the target severity. The processing circuit is further configured to calculate a total predicted output volume of the one or more output oil products by summing the volume of each output oil product. The processing circuit is further configured to calculate the volume gain within the fluid catalytic cracking unit as a function of the total predicted output volume.

In some embodiments, generating a target severity predicted to optimize the volume gain further includes providing a penalty separate from the volume gain, the penalty defined as a function of a constrained variable affected by the control system relative to a threshold value of a constraint that applies to the constrained variable. In some embodiments, the processing circuit is configured to use the neural network model to predict a value of the constrained variable predicted to result from the target severity and calculate a value of the penalty as a function of the value of the constrained variable.

In some embodiments, the processing circuit is configured to train the neural network model during an offline training period using historical plant data. In some embodiments, the historical data includes at least one of one or more manipulated variables provided as inputs to equipment of the fluid catalytic cracking unit, one or more controlled variables affected by operating the equipment of the fluid catalytic cracking unit, one or more disturbance variables that affect the one or more controlled variables but are not directly controlled.

In some embodiments, the neural network model includes a predictor neural network model and the processing circuit is configured to train the predictor neural network model by initializing the predictor neural network model with an initial set of weights, using the predictor neural network model to predict the volume of the one or more output oil products at a historical time step based on historical plant data for one or more previous time steps occurring prior to the historical time step, determining an error between predicted values of the volume of the one or more output oil products predicted by the predictor neural network model and actual values of the volume of the one or more output oil products defined by the historical plant data, and adjusting the weights of the predictor neural network model to reduce the error.

In some embodiments, the neural network model includes a predictor neural network model and controller neural network model. In some embodiments, the processing circuit is configured to train the controller neural network model by initializing the controller neural network model with an initial set of weights, generating a time series of predicted values of the volume of the one or more output oil products using the predictor neural network model and the controller neural network model, calculating a value of an objective function based on the time series of predicted values of the volume of the one or more output oil products, adjusting the weights of the controller neural network model to optimize the volume gain.

In some embodiments, generating the time series of predicted values of the volume of the one or more output oil products using the predictor neural network model and the controller neural network model includes (i) using the predictor neural network model to predict the volume of the one or more output oil products at a historical time step based on a training input including historical plant data for one or more previous time steps occurring prior to the historical time step, (ii) updating the training input to include the volume of the one or more output oil products at the historical time step predicted by the predictor neural network model, (iii) using the controller neural network to predict the target severity at the historical time step based on the training input, (iv) updating the training input to include the target severity at the historical time step generated by the controller neural network model, (v) advancing the historical time step to a next time step within a training period, and (vi) repeating steps i-v until the historical time step reaches an end of the training period.

Another implementation of the present disclosure is a method for automatic operation of a fluid catalytic cracking unit. The method includes calculating volume gain within the fluid catalytic cracking unit by comparing a volume of one or more input oil feeds to the fluid catalytic cracking unit to a volume of one or more output oil products of the fluid catalytic cracking unit. The method further includes using a neural network model to generate a target severity predicted to optimize the volume gain within the fluid catalytic cracking unit. The method further includes operating a reactor severity control device using the target severity to modulate a temperature affecting the volume gain within the fluid catalytic cracking unit.

In some embodiments, the method further includes adjusting a catalyst reaction within the fluid catalytic cracking unit within which the one or more input oil feeds are converted into the one or more output oil products, wherein the temperature affecting the volume gain within the fluid catalytic cracking unit is a reactor temperature within the reactor.

In some embodiments, the method further includes heating a feed of one or more of the input oil feeds before the one or more of the input oil feeds enter the fluid catalytic cracking unit, wherein the temperature affecting the volume gain within the fluid catalytic cracking unit is a preheat temperature of the one or more input oil feeds.

In some embodiments, the method further includes using the neural network model to predict a volume of each output oil product of the one or more output oil products predicted to result from the target severity, calculating a total predicted output volume of the one or more output oil products by summing the volume of each output oil product, and calculating the volume gain within the fluid catalytic cracking unit as a function of the total predicted output volume.

In some embodiments, using the neural network model to generate the target severity predicted to optimize the objective function includes generating a penalty within the objective function separate from the volume gain, the penalty defined as a function of a constrained variable affected by the control system relative to a threshold value of a constraint that applies to the constrained variable. In some embodiments, the method further includes using the neural network model predict a value of the constrained variable predicted to result from the target severity and calculate a value of the penalty as a function of the value of the constrained variable.

In some embodiments, the method further includes training the neural network model during an offline training period using historical plant data including at least one of one or more manipulated variables provided as inputs to equipment of the fluid catalytic cracking unit, one or more controlled variables affected by operating the equipment of the fluid catalytic cracking unit, one or more disturbance variables that affect the one or more controlled variables but are not directly controlled.

In some embodiments, the method further includes initializing the predictor neural network model with an initial set of weights, using the predictor neural network model to predict the volume of the one or more output oil products at a historical time step based on historical plant data for one or more previous time steps occurring prior to the historical time step, determining an error between predicted values of the volume of the one or more output oil products predicted by the predictor neural network model and actual values of the volume of the one or more output oil products defined by the historical plant data, and adjusting the weights of the predictor neural network model to reduce the error. In some embodiments, the neural network model includes the predictor neural network model.

In some embodiments, the method further includes initializing a controller neural network model with an initial set of weights, generating a time series of predicted values of the volume of the one or more output oil products using a predictor neural network model and the controller neural network model, calculating a value of the objective function based on the time series of predicted values of the volume of the one or more output oil products, and adjusting the weights of the controller neural network model to optimize the objective function. In some embodiments, the neural network model includes the predictor neural network model and the controller neural network model.

Another implementation of the present disclosure is a controller for controlling operation of a fluid catalytic cracking unit. The controller includes a processing circuit configured to calculate the volume gain within the fluid catalytic cracking unit by comparing a volume of one or more input oil feeds to the fluid catalytic cracking unit to a volume of one or more output oil products of the fluid catalytic cracking unit. The processing circuit is further configured to use a predictive model to generate a target severity predicted to optimize the volume gain within the fluid catalytic cracking unit. The processing circuit is further configured to operate a reactor severity control device using the target temperature to modulate a severity affecting the volume gain within the fluid catalytic cracking unit.

In some embodiments, the processing circuit is configured to use the predictive model to predict a volume of each output oil product of the one or more output oil products predicted to result from the target severity, calculate a total predicted output volume of the one or more output oil products by summing the volume of each output oil product, and calculate the volume gain within the fluid catalytic cracking unit as a function of the total predicted output volume.

In some embodiments, the predictive model is configured to perform model predictive control (MPC) to generate the target severity predicted to optimize the volume gain within the fluid catalytic cracking unit.

In some embodiments, using the predictive model to generate the target severity includes using an inferential to determine a value of a variable affecting the volume gain, the inferential comprising an inference that infers the value of the variable affecting the volume gain based on an inferential functionality performed by the predictive model.

In some embodiments, using the predictive model to generate the target severity includes receiving historical data including at least one of a feed rate for the one or more input oil feeds at a historical time step or a feed quality of the one or more input oil feeds at the historical time step and using the predictive model to predict the volume of the one or more output oil products at the historical time step based on the received historical data.

In some embodiments, using the predictive model to generate the target severity includes determining the target severity based on the volume of the one or more output oil products at the historical time step predicted by the predicted model. In some embodiments, operating the reactor severity control device includes operating the reactor severity control device to adjust at least one of the feed rate or the feed quality to achieve the target severity in the fluid catalytic cracking unit.

DETAILED DESCRIPTION

Overview

Figure 1:
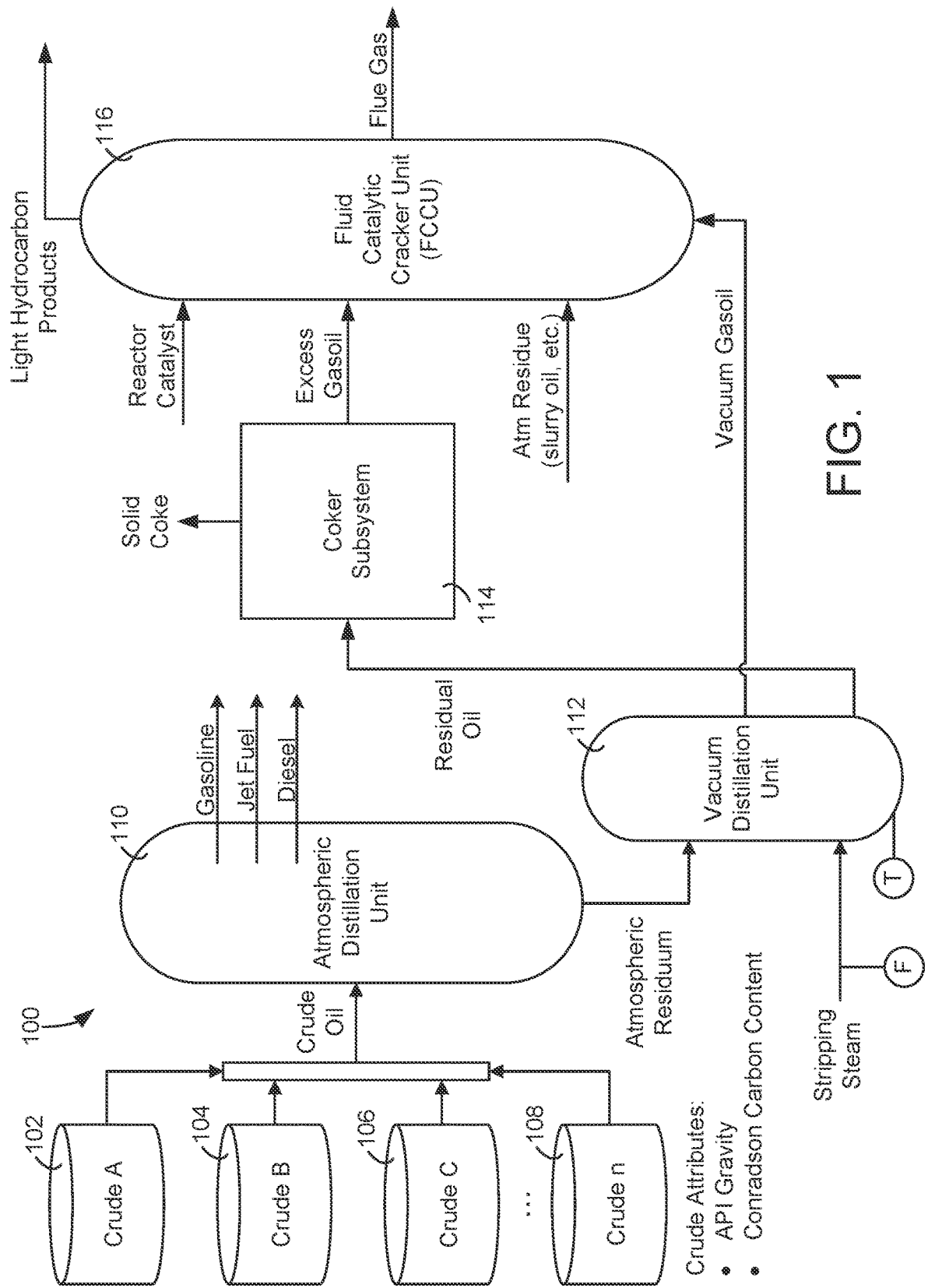
FIG. 1 is a diagram of a petroleum refinery system, according to some embodiments.

Referring generally to the FIGURES, systems and methods for optimizing the operation of a fluid catalytic cracking unit (FCCU) are shown, according to some embodiments. A controller may be implemented that incorporates a neural network system. The neural network system may include one neural network configured to generate predictions of control variables (CV's) based on the historical data of the plant prior to the time step of the predicted CV. Once trained, the first neural network can provide the predicted CV's to a second neural network. The second neural network may predict manipulated variables (MV's) of a future time step (or a current time step, for training purposes) and use that information to provide control signals to oil refinery equipment based on the MV predictions. Advantageously, this allows for a neural network system that can accurately predict appropriate CV's (e.g., volume gain of an FCCU) based on how the oil refinery has been operating, and then accurately predict how the MV's (e.g., reactor severity of the FCCU) should be adjusted to accurately reach the predicted CV's. This can provide a heighted level of optimization with reduced processing, as the neural networks can be trained offline prior to being implemented.

System Overview

In some embodiments, fluid catalytic cracking units (FCCUs) (e.g., and residue fluid catalytic cracking units) are critical oil refinery processes that convert less-valuable gas oils to products of higher value, such as naphtha, diesel, propylene and butylene. One characteristic of FCCUs can be that oil refiners are able to produce more volume of products leaving the unit than the volume of feed sent to the unit. In turn, oil refiners are able to sell more volume of product than feed purchased to process. This may be performed via a process known as volume gain (e.g., volume swell, volume expansion, etc.). In some embodiments, FCCU operators attempt to gain as much volume in valuable products as they can through FCCUs—while taking into account, environmental, safety, and reliability constraints—until the economic trade off of volume gain and profitable product selectivity is reached. In some embodiments, a similar approach is taken for residue FCCUs (RFCCUs).

Control systems attempting to optimize volume gain in FCCUs may be complex due to the highly dynamic and non-linear relationships that exist in an FCCU. The reaction mechanism of an FCCU (i.e., catalytic cracking) is highly dependent on reactor severity. In some embodiments, reactor severity is the measure of the energy required to break the molecular bonds in the less-valuable heavy gasoil feedstock to produce the lighter, more valuable molecules. In some embodiments, reactor severity is proportional to or includes reactor temperature. The reactor severity can include any type of heating (e.g., via manual manipulation, chemical reaction, or external heating source) that affects the temperature of input oil feeds entering into the FCCU. For example, the reactor severity can be or include reactor temperature, reactor outlet temperature, riser temperature, and pre-heat temperature, or any combination thereof. In a general embodiment, the volume and/or quality of the feed of catalyst provided to the FCCU is adjusted to control reactor severity, as the catalyst can have a significant effect on the temperature of the input oil feeds during reaction. As such, reactor severity may include catalyst circulation and control.

Heavier and more aromatic feedstocks may require higher severity to achieve optimal volume gain, as molecular bonds in these molecules may be more difficult to crack. However, since reaction severity can be highly dependent on feed qualities, catalyst activity, and catalyst circulation to oil/feed ratios (i.e., cat:oil ratio)—which is a function of feed rate reactor temperatures, and reactor pre-heat temperatures—volume gain can be difficult to predict. In some embodiments, some or all of these may be manipulated variables. Feed qualities, catalyst activity, and cat to oil ratio are dynamic properties that may be constantly changing as various system changes (e.g., incoming hydrocarbon properties, upstream units, disturbances introduced to the FCCU, etc.) can make the control process difficult (e.g., analytically, computationally, etc.) to model in real-time. Additionally, the products produced by FCCUs can have different process gains associated with severity, which can make the volume gain behavior highly non-linear and difficult to optimize with a linear program.

Some embodiments currently disclose solutions that allow FCCU operators to dynamically model, predict, and control FCCU volume using one or more neural networks. These processes may utilize years of plant process data and allow refiners to economically optimize FCCUs in real-time, to maximize volume gain. However as discussed above, there can often be an economic trade-off between increasing volume gain and maximizing conversion of the feed product (e.g., slurry oil). As such, these methods—while at least somewhat optimize volume gain, may not be maximizing volume gain in FCCUs based on reactor severity.

In some embodiments, the systems and methods disclosed herein refer to optimization schemes that consider the feed rate and feed qualities (e.g., but may not require feed quality data as an input) as disturbance variables (DV's)—along with additional process measurements that impact conversion and dynamics, and affects catalyst to oil (cat to oil) ratio (and in turn reactor severity and conversion) through its manipulation variables of reactor (e.g., riser, etc.) temperature and reactor pre-heat temperature—in order to maximize volume gain.

Any of the variables disclosed herein may act as a control variable (CV), DV, MV, or target value (TV). For example, a control schema is implemented that attempts to maximize volume gain (CV). The reactor temperature and/or reactor pre-heat temperature (MV's) are adjusted to optimize the volume gain without adjusting the feed rate (DV) into the FCCU. In another example both the feed rate and the reactor temperature act as manipulated variables. Other variables that may generally be implemented as DV's include feed rate, feed gravity (e.g., density of feed), feed quality, feed tank quality, forecasted stream qualities based on planning/scheduling tools, upstream unit processes conditions (e.g., crude distillation column cutpoints, vacuum distillation column cutpoints, vacuum gasoil (VGO) hydrotreater bed temperatures, etc.). As discussed above, feed rate may act as MV's to maximize volume gain, as it impact reactor severity similar to pre-heat temperature and reactor temperature. Of course in various embodiments, the feed rate and other variables (e.g., feed quality, etc.) can be MV's or DV's. As described herein, the control inputs/outputs may be referred to as control variables, manipulated variables, and/or disturbance variables.

The control systems described herein may include one or more constraints that can limit the manipulation of the manipulated variables. For example, optimizing the volume gain of the FCCU may depend at least partially on adjusting the pre-heat temperature of the feed entering the FCCU. Constraints that limit the manipulation of the pre-heat temperature can include but are not limited to coil outlet temperature limitations, fuel gas pressure limitations, minimum firing rate limitations, main fractionator bottoms temperature (heat integration), tankage temperature limits (e.g., heat integration, pump limitations, etc.), and preheat furnace stack oxygen content. In another example, optimizing the volume gain of the FCCU may depend at least partially on adjusting the reactor temperature and/or reactor severity, wherein the adjustment thereof is limited by one or more constraints, such as reactor/regenerator metallurgy limits (e.g., temperature, etc.), main fractionator metallurgy limits, regeneration combustion limits, catalyst circulation limitations, air rate limitations, slide valve limitations, and conversion-based limitations, or a combination thereof. Other constrains not disclosed herein may also be considered, such as custom constraints. In some embodiments, utilizing air rate to the reactor or regenerator system may also be used as a manipulated variable to help better relieve some of these constraints while maximizing volume gain.

Before discussing the features of the predictive control systems and methods in detail, it is noted that these predictive control systems and methods can be applied to a wide variety of different types of controllable systems and processes. Several non-limiting examples of potential implementations include a petroleum refinery system, a natural gas processing plant, a liquefied natural gas (LNG) production facility, an olefin manufacturing plant, a commodity chemical manufacturing plant, a polymer production system, a renewable fuel production facility, an ammonia complex processing system, and many other types of industrial, production, or processing systems. To facilitate the explanation and comprehension of the features described herein, the present disclosure will describe the predictive control systems and methods primarily in the context of an oil or petroleum refinery process, as shown in FIG. 1.

However, it should be understood that this is merely one example of a wide variety of potential implementations and should not be regarded as limiting.

As discussed herein, "the system" can refer to any one of the systems described herein, including system 100, system 200, system 300, system 400, system 500, and system 600. In some embodiments, the control schemes implemented herein may refer to some or all parts of one or more of the systems described herein. For example, process 900 as described below may control "the system"—which includes at least parts of system 100 (e.g., feed entering FCCU 116) and parts of system 200 (e.g., components of FCCU 116). As multiple exemplary configurations are disclosed herein, "the system" can refer to operation of an oil refinery process that implements some or all of the attributes described within any one of the systems described herein.

Oil Refinery Process Overview

Referring now to FIG. 1, a system 100 for refining petroleum to transform crude oil (or other crude petroleum products) into more useful products (e.g., gasoline, petrol, kerosene, etc.) is shown, according to exemplary embodiments. FIG. 1 depicts a general system for refining crude oil, but systems including other refinery tools (e.g., a de-salter for the crude oil, hydrocrackers, hydrotreaters, etc.), different configurations of system 100 that include the same components, more or less drums and/or storage containers, and other modifications to system 100 can be considered. System 100 is shown to include crude oil storage tanks (e.g., "oil tanks") 102-108, atmospheric distillation unit (ADU) 110, vacuum distillation unit (VDU) 112, coker subsystem 114, and fluid catalytic cracker unit (FCCU) 116. In some embodiments, system 100 is configured to generate light hydrocarbon products from residue and other heavy hydrocarbons using FCCU 116. System 100 may include a control system configured to optimize the volume gain (e.g., the volume of light hydrocarbons produced Before describing the components of system 100 in detail, it is noted that although system 100 is described primarily as refining oil, it should be understood that the systems and methods described herein can be used to refine or produce any of a variety of petroleum products. For example, system 100 can be operated to produce butane, methane, diesel fuel, fuel oil, gasoline, kerosene, liquefied natural gas, liquefied petroleum gas, propane, microcrystalline wax, naphtha, naphthalene, paraffin wax, petroleum jelly, petroleum wax, refined asphalt, refined bitumen, refined petroleum gas, slack wax, sulfur, petroleum coke, petrochemicals, or any other type of petroleum product. In general, system 100 may be configured to convert one or more input petroleum products into one or more output or derived petroleum products. Although system 100 is described primarily as producing petroleum coke (referred to herein as "coke") as the derived petroleum product, it should be understood that the systems and methods described herein can be applied to any type of petroleum product without departing from the teachings of the present disclosure.

Oil tanks 102-108 may represent the mechanical components and/or methods for storing and providing petroleum into system 100. As disclosed herein, the terms "petroleum" and "crude oil" may be used interchangeably when referring to the mixture of hydrocarbons received prior to oil refining. In some embodiments, the oil stored in oil tanks 102-108 has an American Petroleum Institute (API) gravity of 15-45 degrees, wherein a high API indicates a lower density crude oil and a low API indicates a higher density crude oil. In some embodiments, the oil stored in oil tanks 102-108 has a lower or higher API gravity. In some embodiments, the level of concarbon content (CCR) (e.g., Conradson carbon residue, etc.) is measured to provide an indication of the coke-forming tendencies of the crude oil, prior to providing crude oil to system 100 via oil tanks 102-108. The crude oil stored in oil tanks 102-108 may be recovered through various forms of oil drilling and/or natural petroleum springs. A pumping system may then transfer the received crude oil to store in oil tanks 102-108 and provide the crude oil into atmospheric distillation unit 110.

ADU 110 may be configured to superheat the received crude oil to temperatures that separate the crude oil into its various naturally-occurring components, such as gasoline, kerosene, diesel, fuel oil, and residual oil. While FIG. 1 shows a single atmospheric distillation unit, system 100 may include any number of atmospheric and/or vacuum distillation units for refining the crude oil. Additionally, the crude oil may be preheated (e.g., by a furnace, by one or more tube-still heaters, etc.) such that the crude oil enters ADU 110 at a temperature where some or most of the crude oil is already vaporized. For example, crude oil may be preheated to a temperature of 250-260° C. The oil then enters a tube-still heater to reach a temperature of 350-360° C., where it is then fed into ADU 110. Upon entering ADU 110, the crude oil is further heated to increase vaporization of the crude oil. The vapor rises within ADU 110 and separates to fractions (e.g., subcomponents, layers, levels, etc.). These fractions may be determined by the temperature at which the vapor phase changes back into a liquid. As such, once the vapor reaches an appropriate fraction layer, the vapor changes back into a liquid and is successfully separated into a distillate of the crude oil. Various distillates may be produced via ADU 110, including light distillates (e.g., liquid petroleum gasoline (LPG), gasoline, naphtha, etc.), middle distillates (e.g., kerosene, jet fuel, diesel, etc.), heavy distillates (e.g., fuel oil, etc.), and residuum (e.g., heavy fuel oil, lubricating oils, vax, asphalt, etc.). In a general embodiment, light distillates may have a boiling point around 150-200° C., middle distillates may have a boiling point around 250-300° C., heavy distillates may have a boiling point around 300-350° C., and residuum may have a boiling point around 350° C. and above. The processes performed by ADU 110 may be referred to a fractional distillation or fractionation. ADU 110 is shown providing the distilled residuum to VDU 112 for further distillation.

VDU 112 may act as another process for distilling petroleum products in a heated container. As shown in FIG. 1, the crude oil residuum is provided to VDU 112 for further distillation. System 100 further shows stripping steam entering VDU 112, which may be included in the distillation process. The stripping steam may be controlled based on flow measurements taken by flow sensors, prior the stripping steam entering VDU 112. VDU 112 may perform vacuum distillation, a process similar to ADU 110, but in a vacuum or close to a vacuum (e.g., 10 mmHg, 20 mmHg, etc.). This process for distilling crude oils may help to produce petroleum products from heavier oils left over from atmospheric distillation, as the low pressure in the vacuum decreases the boiling point for the petroleum products in the crude oil. VDU 112 may produce similar distillates as ADU 110 and decrease the overall residuum left over after distillation. However, residuum from the vacuum distillation of VDU 112 may still be present, and is sent to coker subsystem 114 for further processing. In some embodiments, residual oil from VDU 112 is pumped or otherwise provided to coker subsystem via the lower portion (e.g., the bottom) of FDU 112.

Coker subsystem 114 may be configured to act as a coking system and convert the residual oil from VDU 112 into more distillates, such as hydrocarbon gases, naphtha, gas oils, and coke. The solid coke may be dumped into a coke hauler to be transported away from system 100. The excess gas oils that were not transformed into solid coke may be provided to FCCU 116 for further processing. In some embodiments, the excess gasoil can be further broken down into lighter hydrocarbons via catalytic cracking, which may occur in FCCU 116. Coker subsystem 114 may be similar to ADU 110 in that it separates the feed (e.g., received crude oil) and separates the feed into various distillates using heat.

As disclosed herein, coke may refer to any raw petroleum coke (e.g., green coke) produced in a coker (e.g., a delayed coker, a non-delayed coker, etc.). The coke may include any combination of components including carbon, hydrogen, nitrogen, sulfur, and ash. Additionally, the coke may include any combination of metals, including aluminum, boron, calcium, chromium, cobalt, iron, manganese, magnesium, molybdenum, nickel, potassium, silicon, sodium, titanium, and vanadium. In a general embodiment, the coke is mostly carbon byproducts from the heavy distillates produced in ADU 110. In some embodiments, the cracking processes performed in FCCU 116 result in coke attaching to the reactor catalyst fed into the reactor. This coke may be substantially similar to the coke generated in coker subsystem 114.

FCCU 116 may be or include additional processing that further break down the heavy hydrocarbons received from oil tanks 102-108, into lighter (e.g., more valuable) distillates, such as gasoline, olefinic gasses, dry gas, polypropylene (PP) gas, butanes/butylene (BB), diesel-like products, naphtha-like products, and slurry oil. FCCU 116 may be configured to receive a variety of heavy hydrocarbons found within system 100, such as residue oil from ADU 110, gasoil from VDU 112, excess gasoil from coker subsystem 114, and slurry oil from the bottom of ADU 110. While not currently shown in FIG. 1, atmospheric gas oil may also be provided via ADU 110 to FCCU 116 as well. Additionally, FCCU 116 may receive a catalyst for reacting the incoming feed and compressed air for removing coke building on the catalyst. FCCU 116 may further be configured to release flue gas during the process of converting the feed into lighter hydrocarbons. This process is described in greater detail below with reference to FIG. 2.

Fluid Catalytic Cracking Unit (FCCU) Overview

Figure 2:
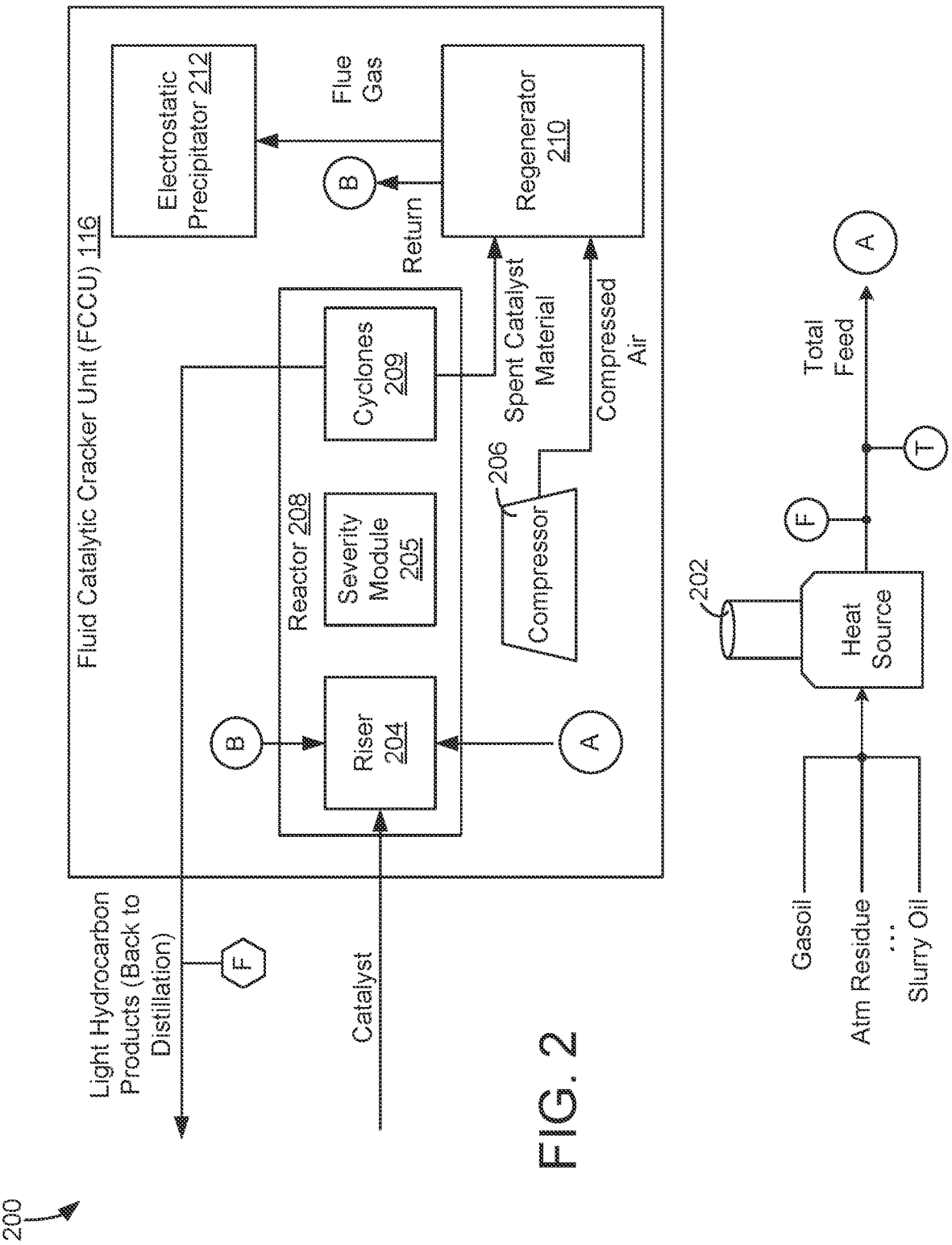
FIG. 2 is a block diagram of a fluid catalytic cracking unit (FCCU) which can be implemented in the petroleum refinery system of FIG. 1, according to some embodiments.

Referring now to FIG. 2, a detailed block diagram of system 200 of a fluid catalytic cracker unit is shown, according to some embodiments. In some embodiments, system 200 shows a "side-by-side" FCCU configuration where the reactor and catalyst regenerator are in two separate vessels. This is merely meant to be exemplary and should not be considered limiting. For example, system 100 may incorporate one or more FCCUs with stacked configurations, side-by-side configurations, or a combination thereof. System 200 may be incorporated partially or entirely within system 100. Additionally, system 200 may include some or all aspects of system 100.

As mentioned above, FCCU 116 can be configured to receive feed (e.g., feedstock, total feed, etc.), which can include a variety of heavy hydrocarbons (e.g., residue oil, gasoil, slurry oil, etc.) and, through a catalyst reaction within a reactor, convert the feed into lighter hydrocarbons that can be more valuable for production. The feed may be heated via heat source 202 (e.g., a furnace, etc.) to preheat the feed prior to entering the reactor of FCCU 116. FCCU 116 is shown to include catalyst riser 204, compressor 206, reactor 208, regenerator 210, and electrostatic precipitator 212.

The feed may enter reactor 208 via catalyst riser 204, where it is vaporized and cracked into smaller molecules of vapor. The vaporized feed may then mix with the catalyst (e.g., a hot, powdered catalyst, etc.) to crack the heavier hydrocarbon feed into lighter hydrocarbon chains. The catalyst may include crystalline zeolite, matrix, binder, and/or filler. The hydrocarbon vapors (e.g., and/or steam, etc.) "fluidize" the powdered catalyst and the mixture of hydrocarbon vapors and catalyst may flow upwards to enter cyclones 209 (e.g., at a temperature of about 535° C., at a pressure of about 1.72 bar, etc.). The resulting light hydrocarbon products may be pumped back to distillation (e.g., ADU 110, etc.), while the spent catalyst material (e.g., remaining heavy hydrocarbons and catalyst material) is provided to regenerator 210 for further processing.

The effectiveness of reactor 208 cracking the heavier hydrocarbons into lighter products may be dependent on the reactor severity of FCCU 116 (represented by severity module 205). Reactor severity may be or include the measure of the energy required to break the molecular bonds in the less-valuable heavy gasoil feedstock to produce the lighter, more valuable molecules. Reactor severity may be at least in part proportional to reactor temperature, as discussed above, and increasing the reactor temperature (e.g., manipulated variable) of FCCU 116 can result in adjusting the volume gain (e.g., volume swell, the controlled variable, etc.) of the FCCU. In some embodiments, severity module 205 is proportional to the increase in temperature within reactor 208, but may also be based on a variety of other factors, such as the type of catalyst provided to reactor 208, the amount of catalyst, feed quality, feed volume, and method of cracking (e.g., catalytic, hydro, steam, etc.).

In some embodiments, heavier and more aromatic feedstocks require higher severity to achieve optimal volume gain, as molecular bonds are more difficult to crack. However, since reaction severity can be highly dependent on feed qualities, catalyst activity, and catalyst circulation to oil/feed ratios (i.e., cat:oil ratio)—which is a function of feed rate reactor temperatures, and reactor pre-heat temperatures—volume gain can be difficult to predict. Feed qualities, catalyst activity, and cat to oil ratio are dynamic properties that may be constantly changing as various system changes (e.g., incoming hydrocarbon properties, upstream units, disturbances introduced to FCCU 116, etc.) can make the control process difficult (e.g., analytically, computationally, etc.) to model in real-time. Additionally, the products produced by FCCU 116 can have different process gains associated with severity, which can make the volume gain behavior highly non-linear and difficult to optimize with a linear program.

In some embodiments, one or more reactor severity control mechanisms (e.g., modules, components, etc.) are located proximate to FCCU 116 or upstream/downstream of FCCU 116 to adjust the reactor severity within reactor 208. For example, one reactor severity control mechanism that can adjust the reactor severity within FCCU 116 at least in part can be a valving system that adjusts the flow of catalyst into riser 204. In some embodiments, another reactor severity control mechanism can include a valving system controlling the amount of feed entering FCCU 116. In some embodiments, another reactor severity control mechanism is a heat source 202 that pre-heats the incoming feed. The reactor severity control mechanisms may be part of petroleum refining equipment 726 described below, and may be configured to receive control signals from plant controller 702 to adjust one or more MV's of the plant (e.g., to increase the volume gain of FCCU 116, etc.).

Regenerator 210 may be configured to separate the catalyst material from any coke buildup that may have occurred during the reaction. Since the cracking reactions can produce some carbonaceous material (e.g., catalyst coke) that deposits on the catalyst and can reduce the catalyst reactivity, the catalyst is regenerated by burning off the deposited coke with air blown into the regenerator and/or oxygen is injected into the regenerator. In some embodiments, this air is provided by compressor 206 and/or oxygen is injected by compressor 206. The heavier hydrocarbon material and regenerated catalyst is returned back to riser 204 in reactor 208 to repeat the process. Regenerator 210 may produce flue gas after regenerating the catalyst. This flue gas may be provided to electrostatic precipitator 212 to remove and catalytic material that may be harmful.

Referring now to FIGS. 3-6, several embodiments of different FCCU configurations are shown, according to some embodiments. As discussed above, any number of oil refinery processes and FCCU configurations can be considered. Additionally, any inputs to the processes and/or configurations may act as CV's, MV's, or DV's to a control system operating therein. This is described in greater detail below.

Figure 3:
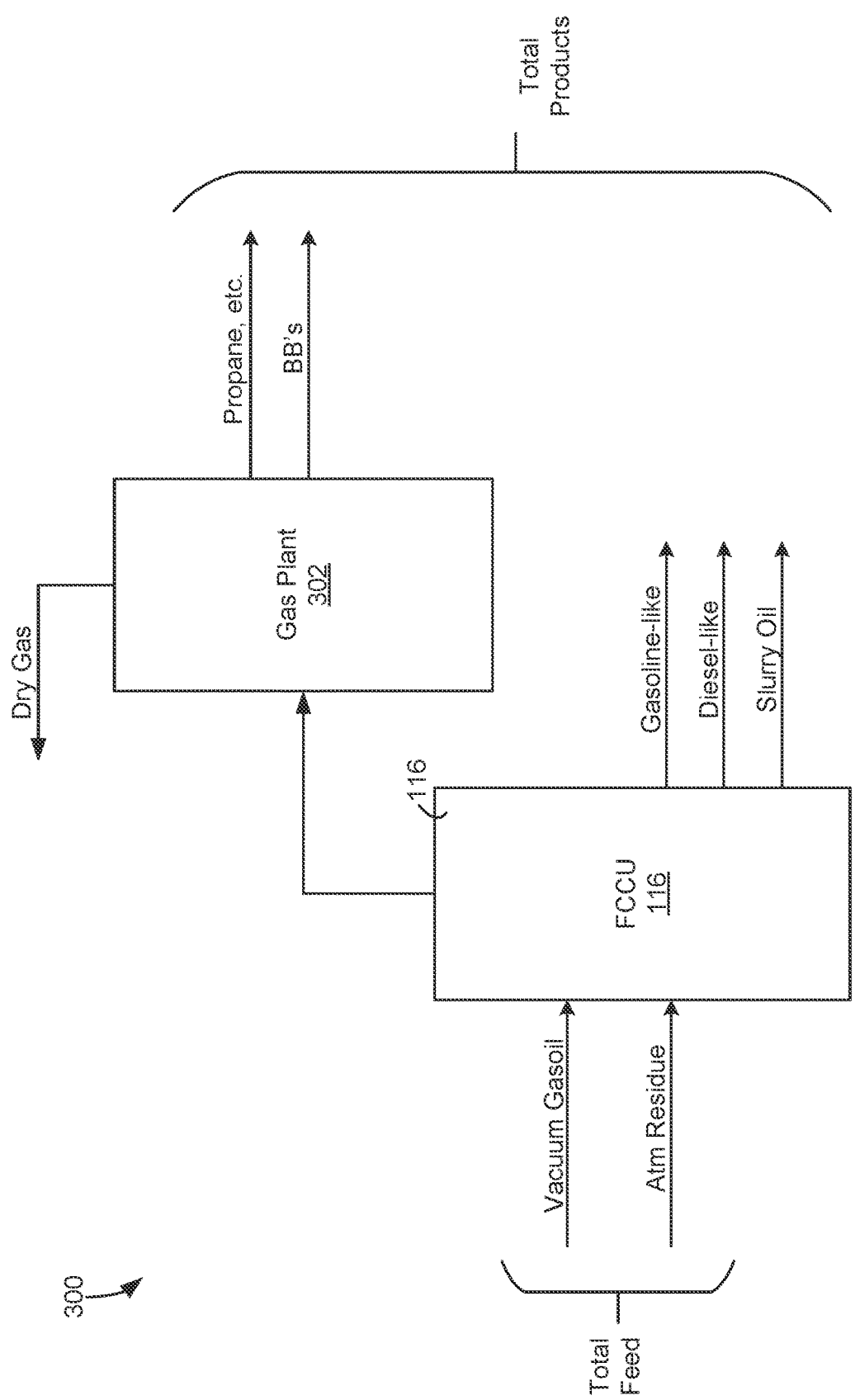
FIG. 3 is a block diagram of an FCCU configuration, which can be implemented in the petroleum refinery system of FIG. 1, according to some embodiments.

Referring particularly to FIG. 3, a block diagram of system 300 showing the inputs and outputs of an FCCU is shown, according to some embodiments. System 300 may be incorporated partially or entirely within system 100 and/or 200. Additionally, system 300 may include some or all aspects of system 100 and/or 200. FCCU 116 receives gasoil and atmospheric residue as the feed input, and produces gasoline-like products, diesel-like products, and slurry oil. In some embodiments, other types of heavy hydrocarbons can be used as inputs to FCCU 116, such as slurry oil or excess gasoil from the output of a coking process. FCCU 116 further shows products routed to gas plant 302. In some embodiments, gasoline comes out the bottom of gas plant 302, depending on site (e.g., system) setup and how boundaries around units.

Gas plant 302 may be configured to take refinery gas from the distillation units and other process units and separate the gas liquids. In some embodiments, gas plant 302 is or includes ADU 110. In other embodiments, gas plant 302 is located prior to the lighter hydrocarbons entering ADU 110, or after leaving ADU 110. Gas plant 302 is shown to separate the lighter hydrocarbons from FCCU 116 into distilled products (e.g., dry gas, polypropylene (PP) gas, butanes/butylene (BB) gas, etc.).

A control system may be configured to monitor any of the systems described herein (e.g., system 100, system 200, system 300, etc.) and attempt to optimize the volume gain in the system. For example, as shown in system 300 in FIG. 3, the total feed includes the vacuum gasoil and the atmospheric residue entering FCCU 116. The total products (e.g., yield, etc.) may include, PPs, BBs, gasoline-like products, diesel-like products, and slurry oil. The volume gain may be calculated using the following equation:

$$\text{Volume Gain} = \frac{\text{Total Products}}{\text{Total Feed}}$$

As such, a continual increase in feed to increase the total products can have an adverse effect on the maximum volume gain. In contrast, too low of a feed can result in not enough total product being produced, thus reducing the volume gain. Control techniques may be implemented to optimize the volume gain within these constraints. In some embodiments, the quantity and/or feed may not necessarily be proportional to volume gain (i.e., too low of a feed does not necessarily mean a reduction in volume gain, etc.). The feed rate may be used as an MV and an objective function is maximized rather than simply maximizing volume gain, wherein, in some embodiments, too low of a feed can result in not enough total product being produced, thus reducing the economic objective function.

Figure 4:
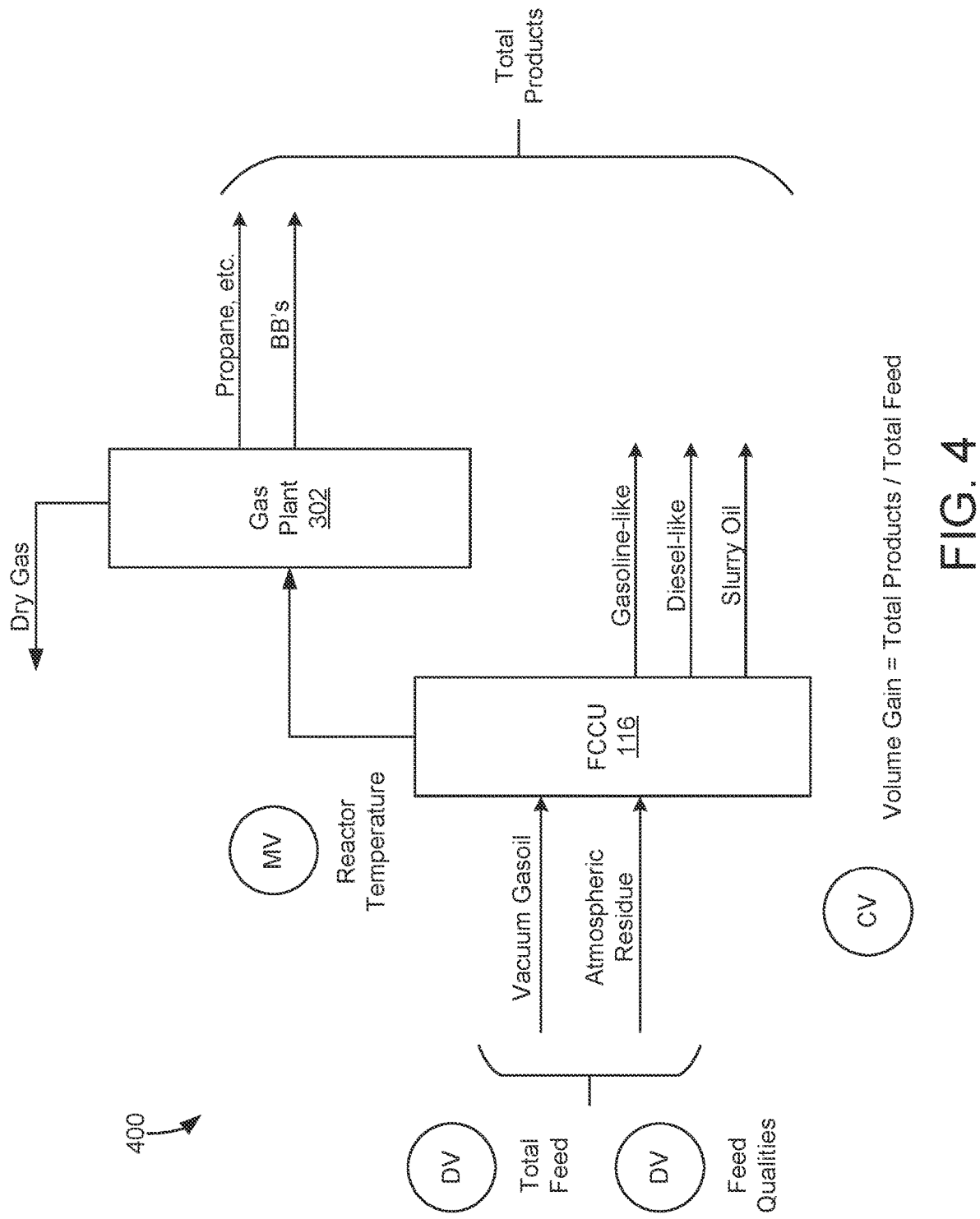
FIG. 4 is a block diagram of another FCCU configuration, which can be implemented in the petroleum refinery system of FIG. 1, according to some embodiments.

Referring now to FIG. 4, a block diagram of system 400 showing the inputs and outputs of an FCCU is shown, according to some embodiments. System 400 may substantially similar to system 300 but includes indicators of particular inputs that will be used in controlling system 400. Specifically, system 400 shows reactor temperature acting as a manipulated variable, total feed and feed qualities acting as disturbance variables, and volume gain acting as a control variable. In some embodiments, total feed, feed qualities, or some components of total feed is also considered a manipulated variable, and the control system adjusts the feed rate into FCCU 116 based to adjust the reactor severity occurring within FCCU 116. In some embodiments, the volume gain equation (as shown in FIG. 4) can consider dry gas.

Figure 5:
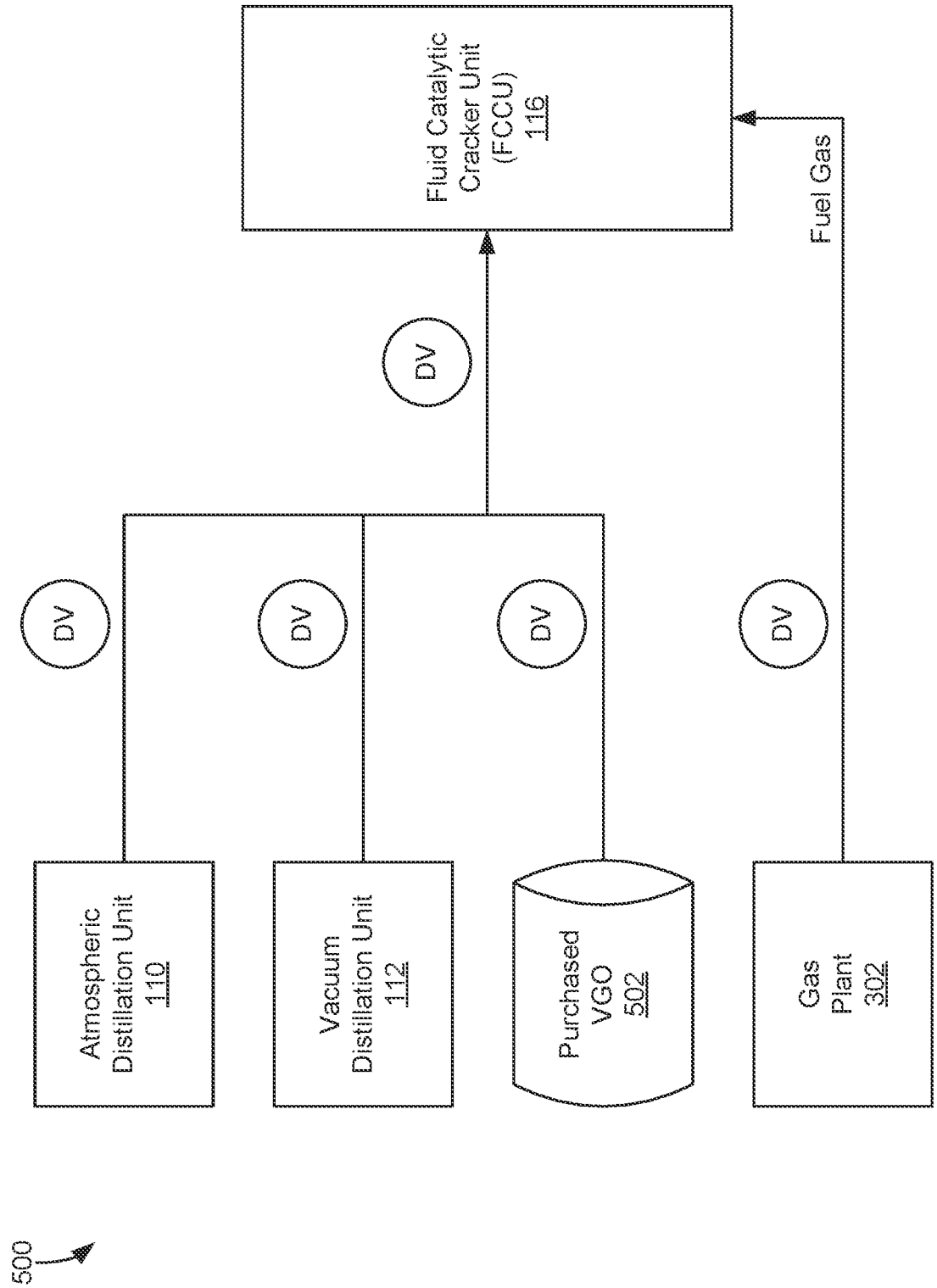
FIG. 5 is a block diagram of feed sources entering an FCCU, which can be implemented in the FCCU of FIG. 2, according to some embodiments.

Referring now to FIG. 5, a block diagram of system 500 showing the feed inputs to an FCCU is shown, according to some embodiments. System 500 shows ADU 110, VDU 112, purchased vacuum gas oils (VGO) 502, and gas plant 302 providing products to the input of FCCU 116 as feed for processing. As discussed above, ADU 110 and VDU 112 may provide residue oil and vacuum gas oils, respectively, to be provided as feed to FCCU 116. Additionally, purchased VGO 502—which may be or include purchased gas oils that were not generated within system 100—may also provide vacuum gas oils to FCCU 116 to be part of the total feed. In some embodiments, gas plant 302 may provide additional heavier hydrocarbons that still need to be cracked/processed within FCCU 116.

In some embodiments, the DV's as shown in FIG. 5 represent different feed qualities entering FCCU 116. For example, ADU 110 may provide a feed portion containing 80% slurry oil compared to VDU 112 only providing 10% of slurry oil. In some embodiments, any and all of the components of crude oil that have boiling points above about 343° C. (650° F.) are included within the atmospheric residue provided by ADU 110. Each of the DV's may represent the makeup of the heavy hydrocarbon feed being provided to the total feed that will eventually enter into FCCU 116 (as shown in FIG. 5). In other embodiments, the DV's represent feed rates, feed temperatures (e.g., prior to pre-heating, etc.), total amount of feed, or a combination thereof.

Figure 6:
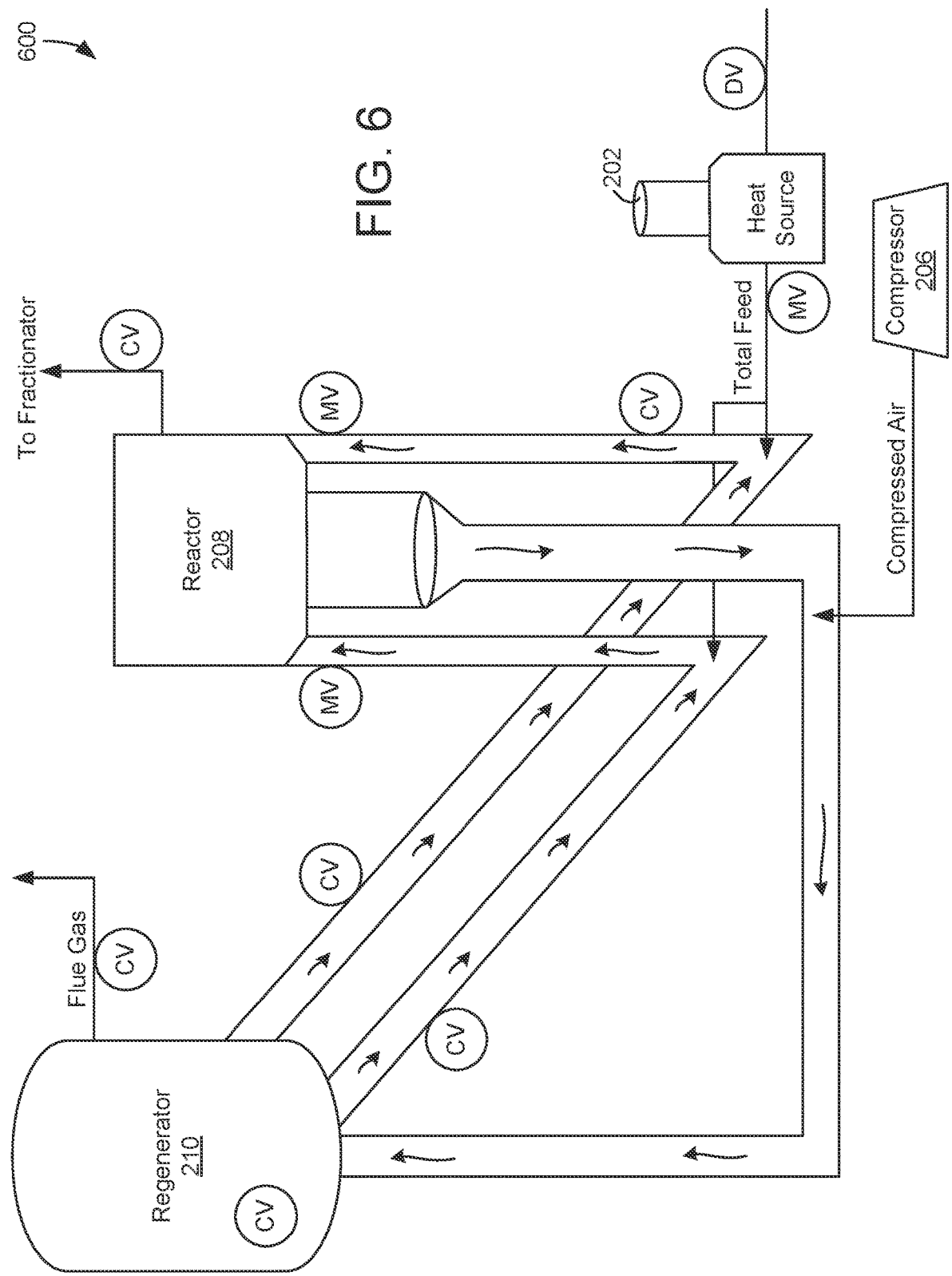
FIG. 6 is a diagram of a side-by-side FCCU configuration, which can be implemented in the FCCU of FIG. 2, according to some embodiments.

Referring now to FIG. 6, system 600 for performing fluid catalytic cracking is shown, according to some embodiments. System 600 may be performed partially or entirely by FCCU 116, as described above. In some embodiments, system 600 is incorporated partially or entirely within any of the systems described herein (e.g., system 100-500, etc.). System 600 is shown to include heat source 202, compressor 206, reactor 208, and regenerator 210. System 600 shows the multiple control inputs that may be provided to a control system and their respective control variables. For example, the temperature and/or flow of the feed entering heat source 202 is a disturbance variable, the temperature and/or flow of the feed leaving heat source 202 is a manipulated variable, and the temperature and/or flow of the feed/catalyst mixture rising within reactor 208 is a manipulated variable.

FIG. 6 includes indications of 6 CV's, 3 MV's, and 1 DV within system 600. As mentioned above, this is merely meant to be exemplary and should not be considered limiting. System 600 shows feed entering heat source 202 prior to being heated. The DV proximate to the this feed line may represent feed quality, feed flow rate, feed temperature prior to pre-heating, etc. Upon being pre-heated, the total feed is provided to reactor 208. As shown in system 600, the temperature of the feed after leaving heat source 202 is a manipulated variable. Once inside reactor 208, temperature inside of reactor 208 is a CV, with the reactor severity (e.g., amount of catalyst being provided, etc.) acting as a manipulated variable. After the reaction process occurs, the volume of the light hydrocarbon products provided to the fractionator (e.g., another distillation column, etc.) acts as a control variable.

The spent catalyst can be provided to regenerator 210 to remove the coke build up on the catalyst. Inside of regenerator 210, the amount of the coke deposit built up on the catalyst may act as a control variable. The processes catalyst can then be provided back to reactor 208 to repeat the cycle. In some embodiments, the processes catalyst volume and/or volume of coke building acts as a control variable. Finally, flue gas may be produced during the reaction within regenerator 210 that produces flue gas. In some embodiments, the amount of flue gas and the composition of the flue gas (e.g., CO, 02, etc.) generated acts as a control variable.

FCCU Control
Model Predictive Control

Figure 7:
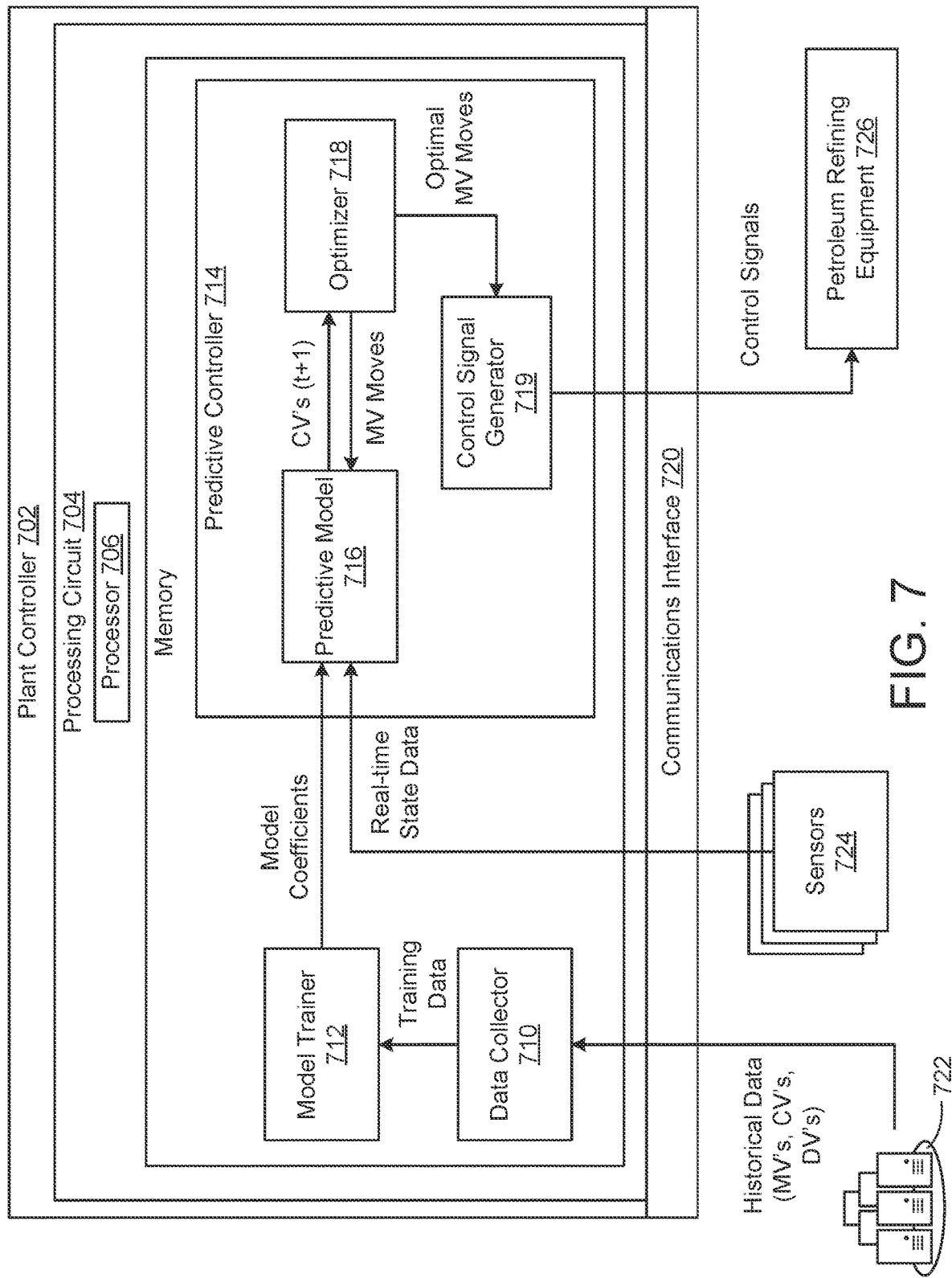
FIG. 7 is a block diagram of a plant controller with model predictive control functionality, which can be implemented in the petroleum refinery system of FIG. 1, according to some embodiments.

Referring now to FIG. 7, a detailed block diagram of plant controller 702 for performing control of system 100 using predictive control (e.g., Model Predictive Control (MPC), etc.). System 700 includes a plant controller 702, database 722, sensors 724, and petroleum refining equipment 726. In some embodiments, plant controller 702 uses a neural network to make control decisions for some or all parts of systems 100-600, which is described in greater detail below. As shown in FIG. 7, plant controller 702 receives historical data from database 722 and input data from sensors 724 and uses model predictive control to generate control signals for petroleum refining equipment 726. Plant controller 702 may be configured to control an oil refinery process as a whole (e.g., control system 100) or a portion or subsystem of system 100, such as system 200. In some embodiments, plant controller 702 is configured to optimize the volume gain of FCCU 116 using a model-based feedback control technique such as MPC or other types of feedback control techniques (e.g., proportional control, proportional-integral (PI) control, proportional-integral-derivative (PID) control, etc.).

Plant controller 702 is shown to include communications interface 720 and processing circuit 704 including processor 706 and memory 708. Processing circuit 704 can be communicably connected to communications interface 720 such that processing circuit 704 and the various components thereof can send and receive data via communications interface 720. Processor 706 can be implemented as a general purpose processor, an application specific integrated circuit (ASIC), one or more field programmable gate arrays (FPGAs), a group of processing components, or other suitable electronic processing components.

Communications interface 720 can be or include wired or wireless communications interfaces (e.g., jacks, antennas, transmitters, receivers, transceivers, wire terminals, etc.) for conducting data communications. In various embodiments, communications via communications interface 720 can be direct (e.g., local wired or wireless communications) or via a communications network (e.g., a WAN, the Internet, a cellular network, etc.). For example, communications interface can include an Ethernet card and port for sending and receiving data via an Ethernet-based communications link or network. In another example, communications interface 720 can include a Wi-Fi transceiver for communicating via a wireless communications network. In another example, communications interface 720 can include cellular or mobile phone communications transceivers.

Memory 708 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present disclosure. Memory 708 can be or include volatile memory or non-volatile memory. Memory 708 can include database components, object code components, script components, or any other type of information structure for supporting the various activities and information structures described in the present disclosure. According to an example embodiment, memory 708 is communicably connected to processor 706 via processing circuit 704 and includes computer code for executing (e.g., by processing circuit 704 and/or processor 706) one or more processes described herein.

In some embodiments, plant controller 702 is implemented within a single computer (e.g., one server, one housing, etc.). In various other embodiments plant controller 702 can be distributed across multiple servers or computers (e.g., that can exist in distributed locations). Further, while FIG. 7 shows database 722 outside of plant controller 702, in some embodiments database 722 can be hosted within plant controller 702 (e.g., within memory 708). Memory 708 is shown to include data collector 710, model trainer 712, and predictive controller 714.

Data collector 710 may be configured to collect or receive one or more data sets for controlling some or all components of systems 100-600. Data collector 710 may receive manipulated variables (MV's), controlled variables (CV's), and disturbance variables (DV's). MV's may be variables that can be adjusted to keep CV's at their intended set points. MV's may include control signals that are provided as inputs to equipment, setpoints that are provided as inputs to controllers, or other variables that can be directly manipulated (i.e., adjusted, set, modulated, etc.) by plant controller 702. CV's may quantify the performance or quality of one or more variables affected by the controlled system or process. Examples of CV's may include measured values (e.g., temperature, pressure, energy consumption, etc.), calculated values (e.g., efficiency, coefficient of performance (COP), etc.), or any other values that characterize the performance or state of a controllable system or process. Some CV's may be quantities that are not capable of being directly manipulated by plant controller 702 (e.g., volume gain of FCCU 116, etc.), but rather can be affected by manipulating corresponding MV's that affect the CV's (e.g., increasing the reactor severity of FCCU 116, etc.). DV's or "load variables" may represent disturbances that can cause CV's to deviate from their respective set points. Examples of DV's include measurable or unmeasurable disturbances to the system such as outside air temperature, outside air humidity, uncontrolled sources of heat transfer, etc. DV's are typically not controllable, but may be measurable or unmeasurable depending on the type of disturbance. Any of the variables described as MV's may be DV's in some embodiments in which the system cannot control those variables. Similarly, any of the variables described as DV's may be MV's in some embodiments in which the system can control those variables. Data collector 710 is configured to provide the training data to model trainer 712.

Data collector 710 may be configured to separate the collected data into one or more episodes. In some embodiments, the historical data represents a variety of different control situations over different periods of time. The full set of historical data may represent the non-linear behavior of the system over a relatively long time period (e.g., days, months, years, etc.). Each sample of the historical data may include values for all of the MV's, CV's DV's, and potentially other variables at an instantaneous time or over a time step having a predetermined duration (e.g., 1 second, 1 minute, 15 minutes, 1 hour, etc.). Each sample of the historical data may include a time stamp indicating a time at which the sample was collected and defines a corresponding "state" of the system at the time the sample was collected. In some embodiments, the samples of historical data are separated into "episodes" which include the historical data for a window of time. These episodes may be predetermined prior to being received at plant controller 702 (e.g., the start times, end times, and/or duration of each episode may be predefined) or can be automatically determined within plant controller 702 based on attributes of the historical data and/or an operating condition of system 100 at a time when the historical data were collected.

In some embodiments, data collector 710 groups the time steps into "episodes" for modeling purposes. Each episode may encompass a period of time large enough to include multiple samples of the historical data (e.g., multiple time steps, etc.), but may encompass a period of time small enough such that the behavior of the system is substantially linear within a given episode. In other words, each episode may include a portion of the historical data that, when viewed in isolation, indicates substantially linear system behavior within the episode. In an exemplary embodiment, plant controller 702 is used to provide control instructions to system 100, which operates in a non-linear environment as indicated by the received historical data, when modeled holistically. However, the relationship between the MV's and CV's and/or the DV's and CV's can be modeled as a set of localized linear relationships when broken up into multiple episodes.

In some embodiments, data collector 710 is configured to generate representative values of the MV's, CV's, and DV's for each of the episodes of the historical data. In some embodiments, the representative values may be average, median, mean, or other type of aggregated values of the MV's, DV's, and CV's over the corresponding episode. For example, the representative value of a particular MV over the episode may be the average of all of the values of that particular MV indicated by the samples of the historical data within the episode.

In some embodiments, the historical data include not only multiple samples of the variables that affect the plant equipment (e.g., DV's, MV's, etc.) but also multiple samples of the variables that are affected by operating the plant equipment (e.g., CV's), which are the indicators of the final control product. As control systems for plants can be non-linear, the historical data is separated into episodes that allow the data to be modeled in a linear fashion. The relationships between the MV's and the CV's maintain a linear or generally linear relationship within each episode. In some embodiments, the samples within each episode are then averaged to create a single representative value of each of the variables for the episode, which are then used to train a neural network. Specifically, the sets of representative values for the various episodes may be used to train a neural network.

Model trainer 712 may be configured to generate a model of the plant (e.g., system 100) based on the historical data. In some embodiments, the training data also includes data relating to moving MV's and/or step testing. Model trainer 712 may be configured to determine one or more coefficients of a model that represents the dynamic and sometimes nonlinear behavior of the plant. For embodiments in which plant controller 702 performs model predictive control, the coefficients of the model may include values of one or more matrices (e.g., elements of the matrices) that characterize the dynamic behavior of the plant. Model trainer 712 may be configured to provide the model coefficients to predictive controller 714, which is shown to include predictive model 716, optimizer 718, and control signal generator 719.

Predictive model 716 may receive the model coefficients from model trainer 712, resulting in predictive model 716 becoming a trained or identified model. Predictive model 716 may be configured to predict values of the CV's at the next time step t+1 as a function of the real-time state data at time step t as well as a set of potential values for the MV's at time step t. The set of values for the MV's may be treated as decision variables and adjusted by optimizer 718 while performing an optimization process, described in greater detail below. During operation, predictive controller 714 may provide real-time state data as an input to predictive model 716 and use predictive model 716 to generate a trajectory of predicted values of the CV's over a time horizon that extends from time t to a future time step t+T (i.e., t, t+T).

Optimizer 718 may be configured to perform an optimization process using predictive model 716. In some embodiments, the optimization process includes optimizing an objective function or cost function to determine optimal values of the MV's or optimal MV moves. The objective function may include one or more terms that quantify the error between the current or predicted values of the CV's and target or setpoint values for the CV's. In some embodiments, the objective function may include one or more terms that quantify the amount of input resources (e.g., input oil feeds) consumed by system 100 or a cost of the input resources consumed. In some embodiments, the objective function quantifies the volume gain within FCCU 116. Optimizer 718 may be configured to iteratively adjust the values of the MV's and use predictive model 716 to predict the resulting values of the CV's that will result from each set of MV's. Optimizer 718 may continue adjusting the MV's while performing the optimization process until an optimal result is reached (e.g., minimum value of the objective function). Once the optimal result is reached, the values of the MV's that resulted in the optimal result may be designated as optimal values of the MV's or optimal MV moves.

These optimal MV moves may be provided to control signal generator 719, such that control signal generator 719 can provide control signals to petroleum refining equipment to satisfy the optimal MV moves. In some embodiments, only the first step of the control strategy (e.g., the modeled predictions of CV's over the time horizon determined by predictive model 716) is implemented. Then, process repeats itself, and the calculations are repeated starting from the new current state, yielding a new control scheme and new predicted state path for both the MV's and CV's.

Petroleum refining equipment 726 may be configured to receive control signals from plant controller 702 and affect the manipulated variables of the system 100. In some embodiments, petroleum refining equipment 726 includes a valving system to affect the flow of feed into FCCU 116, a valving system to affect the flow of catalyst into riser 204, heat source 202, compressor 206, and other components. In some embodiments, petroleum refining equipment includes equipment capable of adjusting the reactor severity within FCCU 116. Sensors 724 may be configured to provide measurements of environmental data to plant controller 702 as inputs for making control decisions. In some embodiments, the information from sensors 724 acts as CV's, MV's, DV's, TVs or any combination thereof for historical data or real-time data of system 100.

Figure 8:
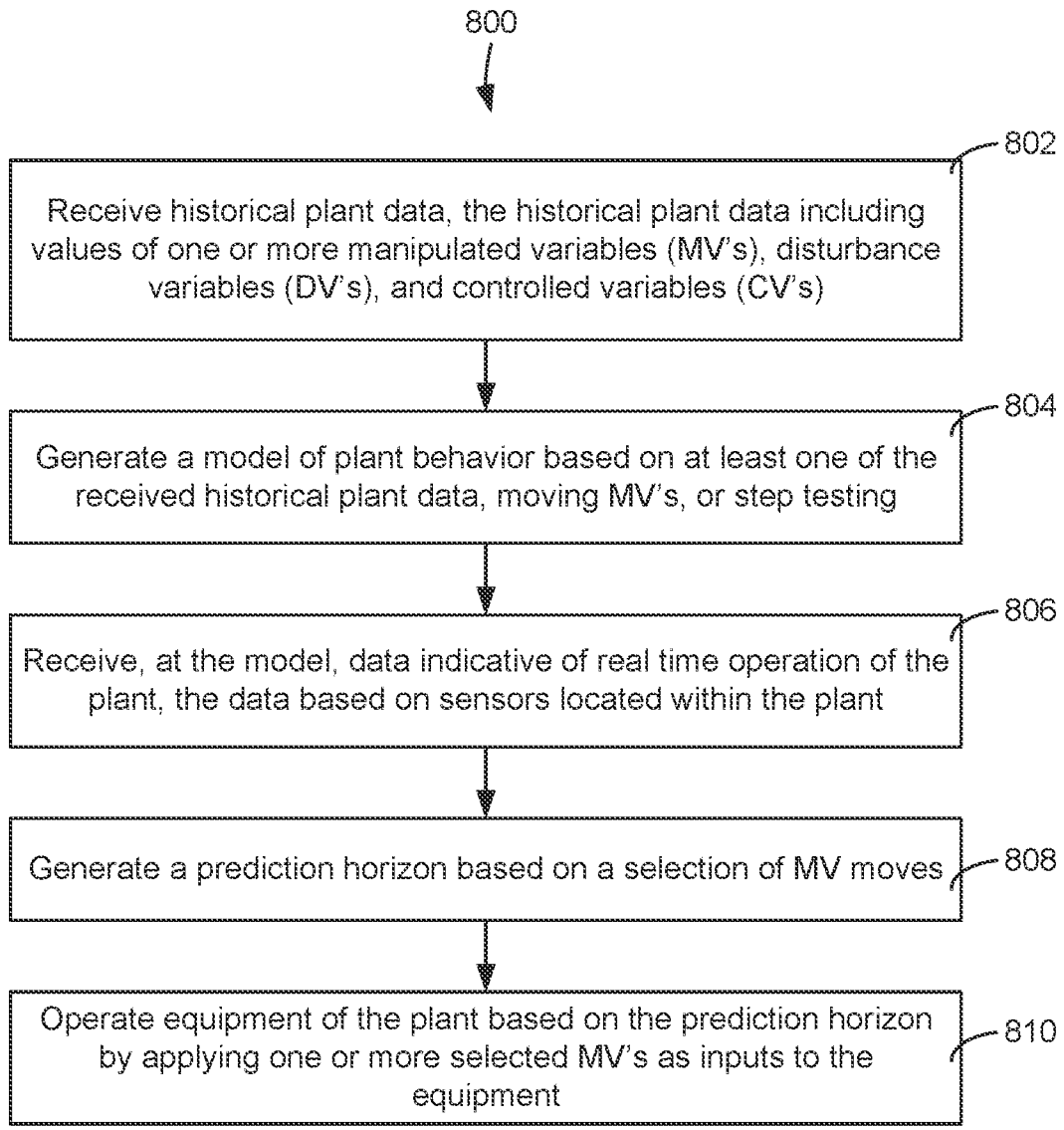
FIG. 8 is a flow diagram of a process for performing model predictive control of a plant, which can be performed by the controller of FIG. 7, according to some embodiments.

Referring now to FIG. 8 a flow diagram of a process 800 for performing model predictive control is shown, according some embodiments. Process 800 may be performed by any of the processing circuitry described herein, such as plant controller 702. In some embodiments, process 800 is at least partially performed by predictive controller 714 as described above with reference to FIG. 7.

Process 800 is shown to include receiving historical plant data, the historical plant data including values of one or more manipulated variables (MV's), disturbance variables (DV's), and controlled variables (CV's) (step 802). Data collector 710 may be configured to receive the historical plant data from database 722. In some embodiments, the data includes MV's, DV's, and/or CV's for one or more historical time periods (e.g., historical states) of the plant (e.g., operation of system 100). For example, at the time step t (e.g., Friday @ 10:15 AM, etc.) the historical data may indicate that the temperature of the feed entering reactor 208 after being pre-heated is 460° C. (MV), the feed prior to entering heat source 202 to be pre-heated is 400° C. (DV), the temperature within reactor 208 (i.e., the temperature relating to the reactor severity, etc.) is 535° C. (MV), and the intended volume gain of FCCU 116 is 2,000 $m^3$ (TV) to optimize volume gain (CV)—the CV potentially being based on any number of factors, such as a ratio of the total amount of light hydrocarbons per the total incoming feed (e.g., 0.6, 0.7, etc.), the monetary value associated with each light hydrocarbon product, the production efficiency of each hydrocarbon product compared to one another, the production efficiency at a given reactor severity, or any combination thereof.

Other CV's, DV's, MV's, and TVs can also be considered. For example, the CV may also incorporate the price of the different lighter hydrocarbons being produced by FCCU 116 as a factor of the optimization problem. In such embodiments, weights may be accorded to the different light hydrocarbon product yields such that those that have less monetary value are weighted lower than those with higher monetary value. In another example, the quality of the feed acts as a manipulated variable, and the plant has control over selectively mixing the different feed components to achieve a certain feed quality.

Process 800 is shown to include generating a model of plant behavior based on at least one of the received historical plant data, moving MV's, or step testing. In some embodiments, the model is generated by model trainer 712. The model can include a predictive model (e.g., a set of matrices used in MPC), multi-variable algorithms, cost functions, objective functions, optimization constraints, initial values of the model (e.g., initial values of states tracked by the model), and/or other criteria for determining a predictive model.

Process 800 is shown to include receiving, at the model, data indicative of real-time operation of the plant, the data based on sensors located within the plant (step 806) and generating a prediction horizon based on a selection of MV moves (step 808). The model coefficients can be provided to predictive model 716, wherein the predictive model is configured to generate CV predictions over a time horizon. The time horizon may be relatively short, as only the first move predicted throughout the time horizon may be implemented during model predictive control.

Process 800 is shown to include operating equipment of the plant based on the prediction horizon by applying one or more selected MV's as inputs to the equipment (step 810). Control signals may be provided to petroleum refining equipment 726 to satisfy optimal MV setpoints that, based on the predictions made by predictive model 716, will achieve the predicted CV's. In some embodiments of implementing process 800 as described above, the chosen MV moves may typically be those for which horizon provides optimal performance in terms of an objective function (e.g., as described below with reference to process 1200, etc.).

In some embodiments, one or more reactor severity control mechanisms (e.g., modules, components, etc.) are located proximate to FCCU 116 or upstream/downstream of FCCU 116 to adjust the reactor severity within reactor 208. For example, one reactor severity control mechanism that can adjust the reactor severity within FCCU 116 at least in part can be a valving system that adjusts the flow of catalyst into riser 204. In some embodiments, another reactor severity control mechanism can include a valving system controlling the amount of feed entering FCCU 116. In some embodiments, another reactor severity control mechanism is a heat source 202 that pre-heats the incoming feed. The reactor severity control mechanisms may be part of petroleum refining equipment 726 described below, and may be configured to receive control signals from plant controller 702 to adjust one or more MV's of the plant (e.g., to increase the volume gain of FCCU 116, etc.).

Offline Trained Predictor Neural Network and Controller Neural Network

Figure 9:
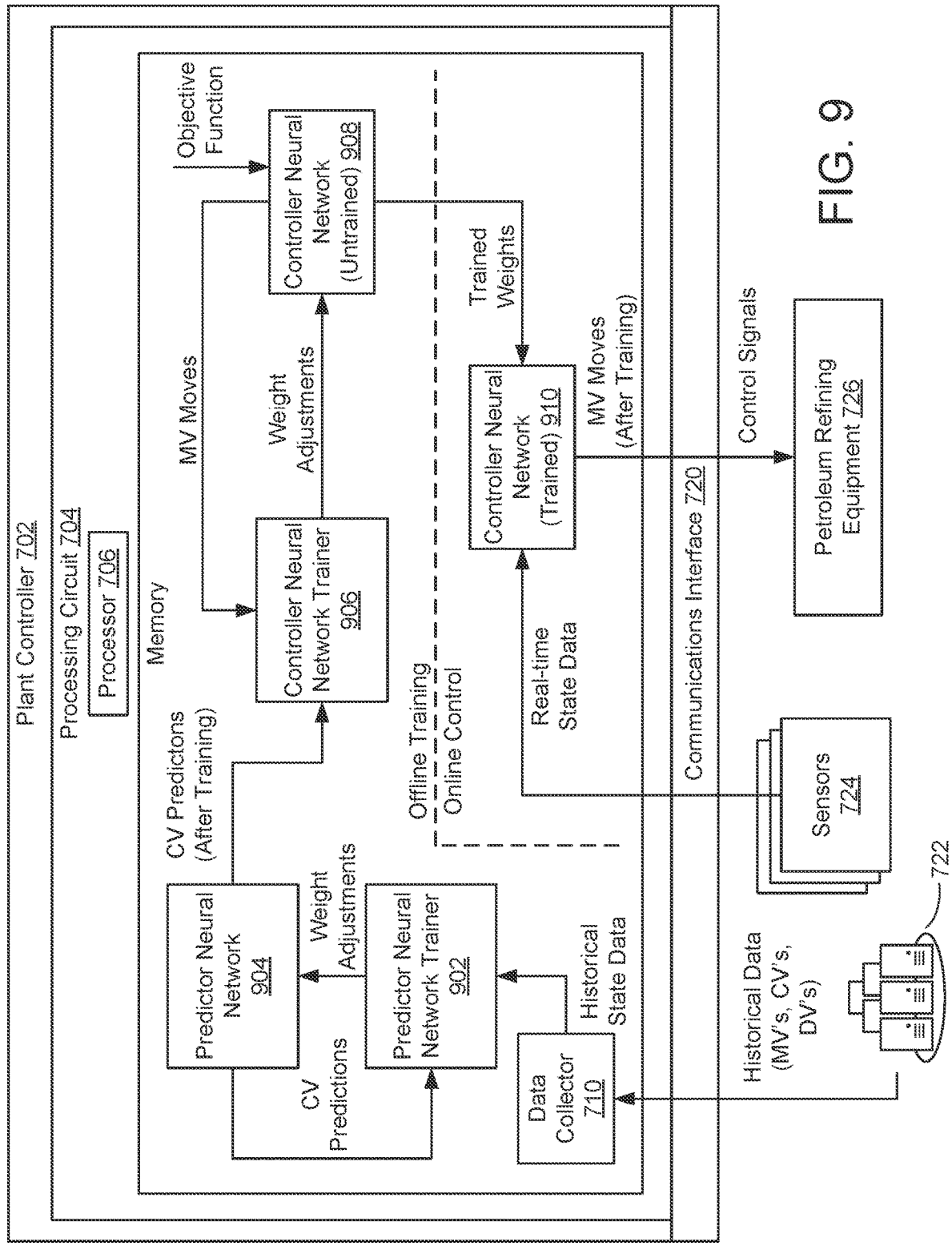
FIG. 9 is a block diagram of a plant controller using offline-trained neural networks to determine MV moves, which can be implemented in the petroleum refinery system of FIG. 1, according to some embodiments.

Referring now to FIG. 9, a block diagram of plant controller 702 is shown, according to some embodiments. In some embodiments, plant controller 702 as shown in FIG. 9 may be configured to perform control of the plant using one or more neural networks. In some embodiments, a first neural network (e.g., predictor neural network 904) is trained offline to make CV predictions. These CV predictions can be provided to a second neural network (e.g., controller neural network 908) for training. Once trained, the second neural network may provide MV moves that can be used to control petroleum refining equipment 726. In the embodiment shown in FIG. 9, memory 708 is shown to include data collector 710, predictor neural network trainer 902, predictor neural network 904, controller neural network trainer 906, controller neural network (untrained) 908, and controller neural network (trained) 910. Any components in FIG. 9 having the same reference numbers as components previously described (e.g., data collector 710) may operate in the same or similar manner in the embodiment shown in FIG. 9.

Predictor neural network trainer 902 may be configured to receive the historical data from data collector 710 and train predictor neural network 904 by adjusting the weights of predictor neural network 904. Predictor neural network trainer 902 may also be configured to receive the CV predictions of the predictor neural network 904 to facilitate training and determine how the weights need to be adjusted. For example, predictor neural network trainer 902 may adjust or tune the weights of predictor neural network 904 such that the CV predictions generated by predictor neural network 904 comply or align with the values of the CV's in the historical data. An example of a process which can be performed by predictor neural network trainer 902 to train predictor neural network 904 is described in greater detail with reference to FIG. 17.

Once trained, predictor neural network 904 may be configured to provide CV predictions as a function of a given state of the plant (e.g., a set of values of the CV's, MV's, DV's, etc.) which may be provided as an input to predictor neural network 904. In some embodiments, predictor neural network 904 is configured to predict the CV's of historical time steps using the set of historical data as an input to predictor neural network 904. In other embodiments, after training, the predictor neural network 904 is configured to predict the CV's for future time periods (e.g., future states of the plant). The CV predictions generated by predictor neural network 904 may be provided to controller neural network trainer 906 and used to train controller neural network (untrained) 908.

In some embodiments, predictor neural network trainer 902 is configured to determine an error between the predicted values of the CV's at historical time step t and actual values of the CV's at historical time step t in the historical training data. This may be performed by implementing a certain error threshold (e.g., 5% 20%, etc.) such that if the predicted CV is within that error threshold, the prediction is considered accurate, and if the predicted CV is outside of that error threshold, the prediction is considered inaccurate. Predictor neural network 904 may require a certain subset of CV predictions to be "accurate" prior to determining that the training of predictor neural network 904 is complete. Other methods for determining the error may be considered, such as determining if the answer is within a predetermined range of values or allowing supervised learning from a technician/engineer.

In some embodiments, predictor neural network 904 is instructed to process a certain number of states, generate a certain number of accurate predictions, or a combination thereof. If this threshold has not been met predictor neural network 902 continues to train until efficient training inputs have been tested. Once this threshold is met, predictor neural network 904 may be considered trained.

In the above example, determining the error may be performed in a manner similar to the training of predictor neural network 904, but instead of adjusting the weights of predictor neural network 904 in response to the comparison of the output vector y and the desired output values vector y', an average error equal to the difference between the vectors y, y' is calculated over one or more time points and the average is displayed to a human user and/or is compared to a threshold. If the average difference is smaller than the threshold, predictor neural network 904 is considered ready for operation. Otherwise, one or more parameters of predictor neural network 904 may be adjusted, such as the weights between nodes of predictor neural network 904, number of layers, the selected inputs to predictor neural network 904 (e.g., specific controlled, manipulated and/or disturbance variables used), the size of the intermediary vectors h1, h2, h3, ... hn and/or the duration T of the time period used to form the input vector x. The training of predictor neural network 904 may then be repeated MV's.

Instead of the training based on each time point on its own, in some embodiments, the training of predictor neural network 904 is performed on sequences of time points together. For each sequence of time points, t1, t2, ... tn, the forming of the vectors and applying of predictor neural network 904 in order to receive the values of the controlled variables, are performed for the first time point of the sequence t1. Then, instead of immediately adjusting the weights of predictor neural network 904 according to a comparison to a desired output values vector y', an input vector for the second time point t2 is created using the outputs of the predictor instead of the stored values from database 722, for the values of the controlled variables at time t1. This process is repeated until predicted values are calculated for time tn. Then, the predicted values for times t1, t2, ... tn are compared to the stored values using a given metric and the neural network is adjusted accordingly.

In some embodiments, rather than predicting explicit values of CV's, predictor neural network 904 is trained, using any suitable method known in the art, to produce a distribution over different possibilities. For example, predictor neural network 904 may output at time point t the mean and covariance of a Gaussian distribution which reflects estimated posterior probabilities of controlled variable values in time point t+1. This allows modeling uncertainty in the behavior of the plant, to optionally be taken into account by plant controller 702.

In some embodiments, an aggregate prediction error is determined during training of predictor neural network 904, which can be an error determination that takes into account several predictions made by predictor neural network 904. The aggregate prediction error could be an average of the errors resulting from each training input, an aggregate error, or any other metric. In some embodiments, the aggregate prediction error weights certain CV predictions over others based on user instruction. For example, it may be more important to accurately predict volume gain (a CV in one embodiment) than the flow rate to reactor 208 (another CV in the embodiment) during training of predictor neural network 904. Other methods for comparing the aggregate prediction error to a threshold may be considered, such as determining if the error is within a predetermined range of value, determining if the error is off by a predetermined percentage or allowing supervised learning from a technician/engineer to make the decision.

Controller neural network (untrained) 908 may be configured to determine the appropriate MV moves while also satisfying one or more constraints or objective functions. In some embodiments, the objective function(s) considered by controller neural network (untrained) 908 quantify the volume gain within FCCU 116 and/or monetary value of the output oil products from FCCU 116. In some embodiments, the objective function(s) considered by controller neural network (untrained) 908 includes one or more penalties associated with the light hydrocarbon products attempting to be optimized. For example, diesel-like products generated via FCCU 116 may be more valuable than naphtha-like products generated via FCCU 116. As such, the objective function may include weights associated with the variables for each of the hydrocarbon products based on their value, such that increasing the product yield of diesel-like products has a more optimizing effect on the objective function than increasing the product yield of naphtha-like products. This can allow the objective function to not only increase volume gain as a whole, but optimize the volume gain to produce the most valuable products given the incoming feed. While monetary value is used in the above example as the reason for differentiating objective function weights, other factors can be considered, such as current amount of products, product efficiency at a given reactor severity, customer demands, etc.

In some embodiments, controller neural network (untrained) 908 is configured to output one or more MV's that will satisfy one or more predicted CV's and/or TVs from a training input. In some embodiments, this is performed by attempting to optimize an objective function (i.e., a function that calculates the error between actual and desired CV values). The objective function(s) may also consider the monetary cost of operating the system in terms of energy consumption, material consumption, or other costs associated with operating the equipment. Objective functions can be augmented with various terms to consider other optimization objectives as well such as penalties for certain types of actions (e.g., switching equipment on/off too rapidly, changing the control signal too rapidly, etc.), penalties for variables exceeding certain limits. These types of penalties can be incorporated into the objective function if they are permitted, or implemented as hard constraints if they are unacceptable and absolutely need to be avoided. Generally, controller neural network (untrained) 908 may act as a training mechanism for receiving the state information from predictor neural network 904 and outputting MV moves (e.g., trajectories, etc.) designated to meet the pre-specified constrains and objectives.

Controller neural network trainer 906 may be configured to adjust the weights of controller neural network (untrained) 908 such that the values of the MV's or MV moves output by controller neural network (untrained) 908 optimize the objective function. In some embodiments, controller neural network trainer 906 uses predictor neural network 904 to predict the values of the CV's that will result from a given set of MV's output by controller neural network (untrained) 908 and uses the predicted values of the CV's to evaluate the objective function. Controller neural network trainer 906 may continue adjusting the weights of controller neural network (untrained) 908 until the MV's output by controller neural network (untrained) 908 result in values of the CV's that optimize the objective function over a given time period. This training may resemble the training described above with reference to predictor neural network 904, with the exception that controller neural network (untrained) 908 is trained to output MV moves that optimize the objective function, whereas the predictor neural network 904 is trained to predict CV's that align with historical data. Once trained, controller neural network (untrained) 908 may become controller neural network (trained) 910 or the weights from controller neural network (untrained) 908 may be provided to controller neural network (trained) 910 for use in online control.

Controller neural network 910 (trained) is shown receiving real-time state data from sensors 724 and outputting MV moves as a function of the real-time state data. It should be appreciated that the real-time state data need not come from sensors 724 in some embodiments, but may be supplied from any type of data source (e.g., databases, controllers, a combination of sensors 724 and other data sources, etc.) During online control, the current state of the plant may be provided as an input to controller neural network (trained) 910. The MV moves output by controller neural network (trained) 910 may be provided to petroleum refining equipment 726 and/or used to generate control signals that are provided to petroleum refining equipment 726.

Figure 10:
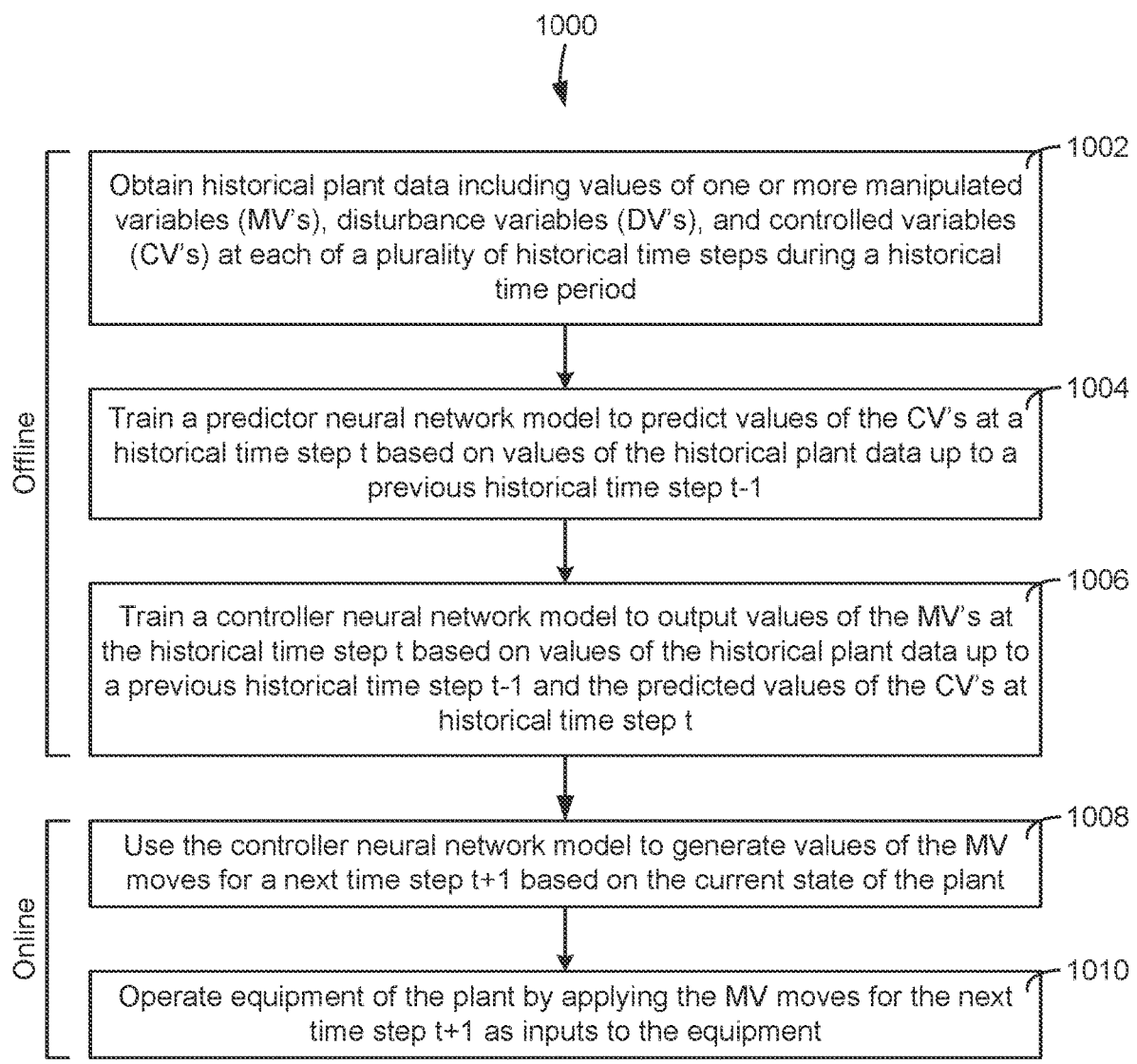
FIG. 10 is a flow diagram of a process for using offline-trained neural networks to determine MV moves, which can be performed by the controller of FIG. 9, according to some embodiments.

Referring now to FIG. 10, a flow diagram of a process 1000 for performing control of the plant using an offline trained predictor neural network and an offline trained controller neural network is shown, according to some embodiments. Process 1000 may be performed by any of the processing circuitry described herein, such as plant controller 702. In some embodiments, process 1000 is at least partially performed by plant controller 702 as described with reference to FIG. 9.

Process 1000 is shown to include obtaining historical plant data, the historical plant data including values of one or more manipulated variables (MV's), disturbance variables (DV's), and controlled variables (CV's) (step 1002). Data collector 710 may be configured to receive the historical plant data from database 722. In some embodiments, the data includes MV's, DV's, and/or CV's for one or more historical time periods (e.g., historical states) of the plant (e.g., operation of system 100).

Process 1000 is shown to include training a predictor neural network model to predict values of the CV's at a historical time step t based on values of the historical plant data up to a previous historical time step t−1 (step 1004). Predictor neural network trainer 902 may receive the historical state data from data collector 710 and begin training predictor neural network 904. The weights of predictor neural network 904 may be updated based on the predicted CV predictions received by predictor neural network trainer 902. Once trained, predictor neural network 904 can provide CV predictions to controller neural network trainer 906 for use in training controller neural network (untrained) 908.

In some embodiments, predictor neural network 904 is trained with the historical plant data. Predictor neural network 904 may receive data over any number of time periods (days, weeks, years, etc.) such that predictor neural network 904 is capable of predicting the CV's of the data set. Plant controller 702 may compare the error to a threshold and determine that further training is required. The weights of predictor neural network 904 may be updated accordingly and the training is repeated until the predictions are within an acceptable error percentage or range. The data input may include a vector of values for each of the MV's, DV's, and CV's (i.e., a time series of each variable including one or more time series values up to time step t−1), which could be provided in the form of a matrix or otherwise. The training period may be based on a certain amount of predictions being made, a certain number of historical data sets/states/episodes being analyzed, data for a certain number of future time steps being predicted, or any combination thereof.

In some embodiments, the weights of predictor neural network 904 and/or bias vectors of predictor neural network 904 are initialized. After initialization, for each of a plurality of time steps, an input vector x is formed of values of CV's, MV's and/or DV's of time points t−T . . . t, and a desired output values vector y' is formed of the values of the controlled variables at time t+1. Predictor neural network 904 is applied to the input vector x and the resultant output vector y is compared to the desired output values vector y'. Based on a difference between the output vector y and the desired output values vector y', the weights of predictor neural network 904 are adjusted in a direction which reduces the difference. The magnitude of the difference is calculated using any suitable difference measure (e.g., absolute value, sum of squares, etc.). The forming of the vectors, applying predictor neural network 904, and adjusting the weights is repeated for many time points, such that predictor neural network 904 reliably models the operation of the system.

Process 1000 is shown to include training a controller neural network model to output values of the MV's at the historical time step t based on values of the historical plant data up to a previous historical time step t−1, and predicted values of the CV's at the historical time step (step 1006). Controller neural network trainer 906 may train controller neural network (untrained) 908 to output values of the MV's at the historical time step t as a function of the current state of the plant at time step t−1. As described above, the process of training the controller neural network model may include adjusting weights of controller neural network (untrained) 908 until the MV moves are adequate (e.g., based on supervised learning), or until they substantially optimize an objective function. For example, the MV moves output by the controller neural network may be provided as an input to the predictor neural network to predict the values of the CV's that will result from the MV moves. The values of the CV's can then be used to evaluate the objective function as described above. This process of adjusting the weights, generating MV moves, predicting CV values, and evaluating the objective function may be repeated until the performance of the controller neural network is acceptable (e.g., the objective function is sufficiently optimized).

Overall, this allows for a neural network system that can accurately predict appropriate CV's (e.g., volume gains) based on how the oil refinery has been operating, and then accurately generate moves for how the MV's (e.g., reactor severity, etc.) should be adjusted to accurately reach the predicted CV's. Advantageously, this provides a heighted level of optimization with reduced processing, as the neural networks can be trained offline prior to being implemented.

Process 1000 is shown to include using the controller neural network model to generate values of the MV moves for a next time step t+1 based on the current state of the plant (step 1008). Now that the controller neural network has been trained, controller neural network (trained) 910 can receive real-time state data indication operation of the plant in real time and determine MV moves based on the received real-time state data.

Offline Trained Predictor Neural Network with Model Predictive Control

Figure 11:
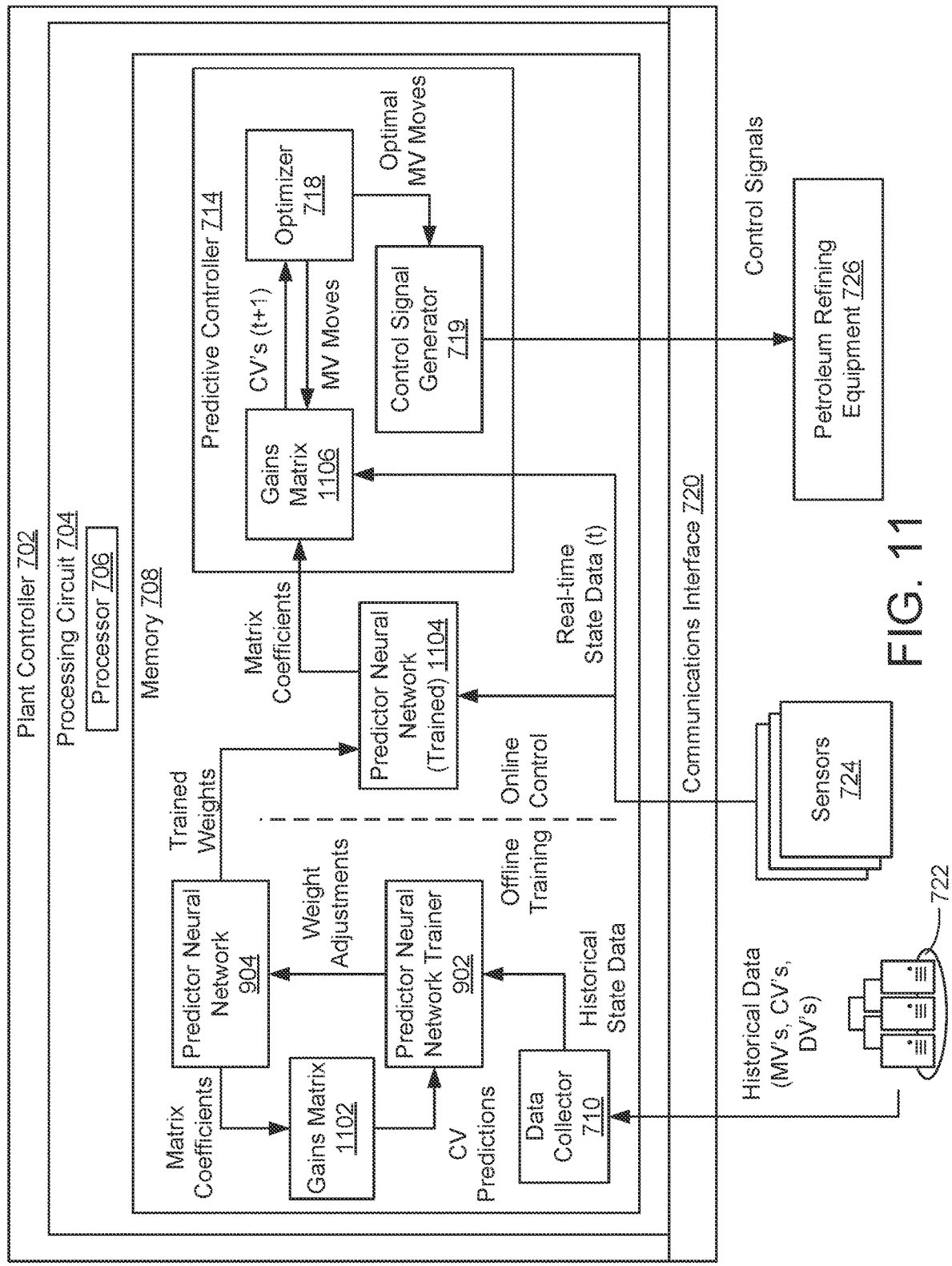
FIG. 11 is a block diagram of a plant controller using an offline-trained neural network to predict CV's for a model predictive controller, which can be implemented in the petroleum refinery system of FIG. 1, according to some embodiments.

Referring now to FIG. 11, a block diagram of plant controller 702 for performing model predictive control of a plant using offline trained neural networks is shown, according to some embodiments. In some embodiments, plant controller 702 as shown in FIG. 11 is configured to train a predictor neural network to generate a gains matrix. The gains matrix may be a matrix including a number of coefficients that provides a linearized representation of plant behavior for a given time period. The gains matrix may be generated based on the historical data for a certain time period, wherein the gains matrix represents the behavior of the plant or parts of the plant at that given time period. The gains matrix can then be used as the model of the plant for model predictive control (e.g., control as described above with reference to FIG. 7, performed by predictive controller 714, etc.). Memory 708 is shown to include data collector 710, predictor neural network trainer 902, predictor neural network 904, gains matrix 1102, predictor neural network (trained) 1104, predictive controller 714, gains matrix 1106, optimizer 718, and control signal generator 719. Any components in FIG. 11 having the same reference numbers as components previously described may operate in the same or similar manner in the embodiment shown in FIG. 11, unless different operation is described below.

Predictor neural network trainer 902 may be configured to train predictor neural network 904 to generate matrix coefficients for gains matrix 1102 based on one or more historical data sets. The matrix coefficients may be used to create gains matrix 1102, which can include a linear representation (e.g., model) of the plant for that historical time period (e.g., the time period or episode during which the historical state data was collected). Predictor neural network trainer 902 may be configured to adjust the weights of predictor neural network 904 and evaluate gains matrix 1102 produced by predictor neural network 904 to determine whether gains matrix 1102 is accurate. For example, predictor neural network 902 may apply historical plant data for time step t−1 as an input to an instance of gains matrix 1102 created by predictor neural network 904 to predict the values of the CV's at time step t. Predictor neural network trainer 902 may compare the output of gains matrix 1102 to the actual values of the CV's at time step t in the historical data to determine whether gains matrix 1102 is sufficiently accurate. Once the gains matrix 1102 is being adequately generated (e.g., predictor neural network 904 produces a gains matrix 1102 that results in sufficiently accurate predictions of the CV's based on the historical state data, etc.), predictor neural network 904 may become predictor neural network (trained) 110.

One example of a gains matrix is shown in the following equation:

$$A(\theta)\Delta V_k = \Delta CV_{k+1}$$

where $A(\theta)$ is the gains matrix, $\Delta V_k$ is a vector of steps or changes in the MV's, CV's and DV's between time step k−1 and time step k, and $\Delta CV_{k+1}$ is a vector of predicted steps or changes in the CV's between time step k and time step k+1. In this example, the gains matrix $A(\theta)$ is multiplied with the vector $\Delta V_k$ of steps or changes in the MV's, CV's and DV's between time step k−1 and time step k (known from the historical data) to calculate the vector $\Delta CV_{k+1}$ of predicted steps or changes in the CV's between time step k and time step k+1.

In some embodiments, $A(\theta)$, $\Delta V_k$, and $\Delta CV_{k+1}$ have the following form:

$$A(\theta) = \begin{bmatrix} \theta_{1,1} & \cdots & \theta_{1,t} \\ \vdots & \ddots & \vdots \\ \theta_{m,1} & \cdots & \theta_{m,t} \end{bmatrix}, \Delta V_k = \begin{bmatrix} \Delta MV_{1,k} \\ \vdots \\ \Delta MV_{l,k} \\ \Delta CV_{1,k} \\ \vdots \\ \Delta CV_{m,k} \\ \Delta DV_{1,k} \\ \vdots \\ \Delta DV_{n,k} \end{bmatrix}, \Delta CV_{k+1} = \begin{bmatrix} \Delta CV_{1,k+1} \\ \vdots \\ \Delta CV_{m,k+1} \end{bmatrix}$$

where $A(\theta)$ is a m×t matrix having coefficients $\theta$, m is the total number of CV's, t is the total number of MV's, CV's and DV's, $\Delta MV_{1,k} \ldots \Delta MV_{l,k}$ are the actual steps or changes in the MV's (l being the total number of MV's) that occurred between time step k−1 and time step k, $\Delta CV_{1,k} \ldots \Delta CV_{m,k}$ are the actual steps or changes in the CV's that occurred between time step k−1 and time step k, $\Delta DV_{1,k} \ldots \Delta DV_{l,k}$ are the actual steps or changes in the DV's (n being the total number of DV's) that occurred between time step k−1 and time step k, and $\Delta CV_{1,k+1} \ldots \Delta CV_{m,k+1}$ are the predicted steps or changes in the CV's between time step k and time step k+1.

Once predictor neural network (trained) 1104 has been generated (e.g., by importing the trained weights from predictor neural network 904), predictor neural network (trained) 1104 can be used for online control. Predictor neural network (trained) 1104 is shown receiving real-time state data from sensors 724 and producing coefficients of a gains matrix 1106 as a function of the real-time state data. Gains matrix 1106 may provide a linearized representation of the dynamic behavior of the plant in real time, localized to the current state of the plant. This can include a live representation (e.g., a single time step), or can include multiple time steps to generate the representation. Gains matrix 1106 can then be used by predictive controller 714 to predict the values of the CV's at the next time step t+1 as a function of the real-time state data at time step t. For example, predictive controller 714 may use gains matrix 1106 as a predictive model (e.g., as predictive model 716), as described with reference to FIG. 7.

Optimizer 718 may operate in the same or similar manner as described with reference to FIG. 7. For example, optimizer 718 may perform an optimization process to determine the optimal MV moves based on the predicted CV's from the gains matrix 1106. Optimizer 718 may use gains matrix 1106 to generate predicted values of the CV's that will result from a given set of MV moves and iteratively adjust the MV moves until optimal values of the CV's are obtained. Control signal generator 719 may receive the optimal MV moves and generate control signals for petroleum refining equipment 726 to satisfy the setpoints for the optimal MV moves.

Control signal generator 719 can be configured to receive MV/CV trajectories and provide control signals to petroleum refining equipment 726. In some embodiments, control signal generator 719 generates control signals for petroleum refining equipment 726 based on the values of the MV's output by optimizer 718. For example, if the MV value is a temperature, the control signal can be a signal for a heat source 202 to increase or decrease heating to achieve the target temperature value. This can be advantageous for embodiments in which the MV's are essentially setpoints and a local controller is needed to convert the setpoints into control signals for equipment that operate to achieve the setpoints.

Figure 12:
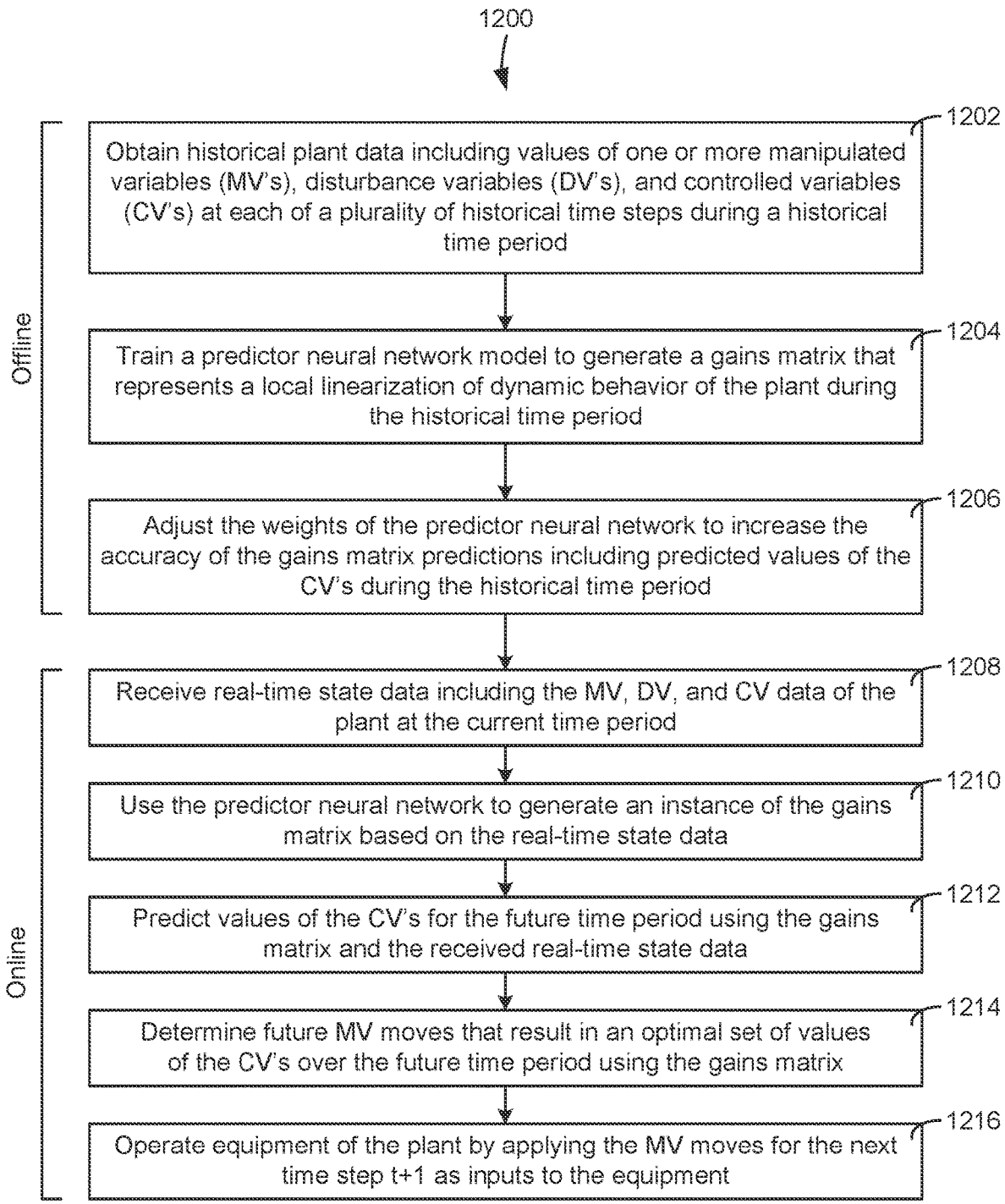
FIG. 12 is a flow diagram of a process for using an offline-trained neural network to predict CV's for a model predictive controller, which can be performed by the controller of FIG. 11, according to some embodiments.

Referring now to FIG. 12, a flow diagram of a process 1200 for performing control of the plant using an offline predictor neural network that generates a gains matrix is shown, according to some embodiments. Process 1200 may be performed by any of the processing circuitry described herein, such as plant controller 702. In some embodiments, process 1200 is at least partially performed by plant controller 702 as described above with reference to FIG. 11.

Process 1200 is shown to include obtaining historical plant data including values of one or more manipulated variables (MV's), disturbance variables (DV's), and controlled variables (CV's) (step 1202). Data collector 710 may be configured to receive the historical plant data from database 722. In some embodiments, the data includes MV's, DV's, and/or CV's for one or more historical time periods (e.g., historical states) of the plant (e.g., operation of system 100).

Plant controller 702 may obtain one or more "states" of the plant operation. As discussed above, the historical data represents a variety of different control situations over different periods of time. The full set of historical data may represent the non-linear behavior of the system over a relatively long time period (e.g., days, months, years, etc.). Each sample of the historical data may include values for all of the MV's, CV's DV's, and potentially other variables at an instantaneous time or over a time step having a predetermined duration (e.g., 1 second, 1 minute, 15 minutes, 1 hour, etc.). Each sample of the historical data may include a time stamp indicating a time at which the sample was collected and defines a corresponding "state" of the system at the time the sample was collected. As such, predictor neural network 904 may use the state data to predict future CV's and provide the predicted CV's to controller neural network 908 for prediction of future MV's.

Process 1200 is shown to include training a predictor neural network model to generate a gains matrix that represents a local linearization of dynamic behavior of the plant during the historical time period (step 1204) and adjusting the weights of the predictor neural network to increase the accuracy of the gains matrix predictions including predicted values of the CV's during the historical time period (step 1206). Predictor neural network trainer 902 may be configured to adjust the weights of predictor neural network 904 to ensure that the gains matrix 1102 generated by predictor neural network 904 accurately predicts values of the CV's in the historical data set.

Process 1200 is shown to include receiving real-time state data including the MV, DV, and CV data of the plant at the current time period (step 1208), using the predictor neural network to generate an instance of the gains matrix based on the real-time state data (step 1210), and predicting values of the CV's for the future time period using the gains matrix and the received real-time state data (step 1212). Once predictor neural network (trained) 1104 is trained, predictor neural network (trained) 1104 can receive real-time state data (e.g., data relating to the operation of the plant) via sensors 724 and generate a gains matrix 1106 based on that data. The gains matrix 1106 (i.e., the linearized representation of the current state) can then be used to predict future CV's (e.g., CV's for t+1, etc.), which can be provided to optimizer 718 during the optimization process.

Process 1200 is shown to include determining future MV moves that result in an optimal set of values of the CV's over the future time period using the gains matrix (step 1214). In some embodiments, the predictive controller 714 can input the real-time state data into the gains matrix to determine one or more CV values in a future time step, as discussed above. Then, predictive controller 714 may determine the MV adjustments required to reach the predicted CV value. The MV adjustments can be based on the model presented in the gains matrix, an attempt to satisfy an objective function received by predictive controller 714, or a combination thereof.

Process 1200 is shown to include operating equipment of the plant by applying the MV moves for the next time step t+1 as inputs to the equipment (step 1216). In some embodiments, petroleum refining equipment 726 can operate a reactor severity control device using the target severity to modulate the MV (e.g., the temperature affecting the volume gain within the fluid catalytic cracking unit, etc.).

In some embodiments, one or more reactor severity control mechanisms (e.g., modules, components, etc.) are located proximate to FCCU 116 or upstream/downstream of FCCU 116 to adjust the reactor severity within reactor 208. For example, one reactor severity control mechanism that can adjust the reactor severity within FCCU 116 at least in part can be a valving system that adjusts the flow of catalyst into riser 204. In some embodiments, another reactor severity control mechanism can include a valving system controlling the amount of feed entering FCCU 116. In some embodiments, another reactor severity control mechanism is a heat source 202 that pre-heats the incoming feed. The reactor severity control mechanisms may be part of petroleum refining equipment 726 described below, and may be configured to receive control signals from plant controller 702 to adjust one or more MV's of the plant (e.g., to increase the volume gain of FCCU 116, etc.).

Figure 13:
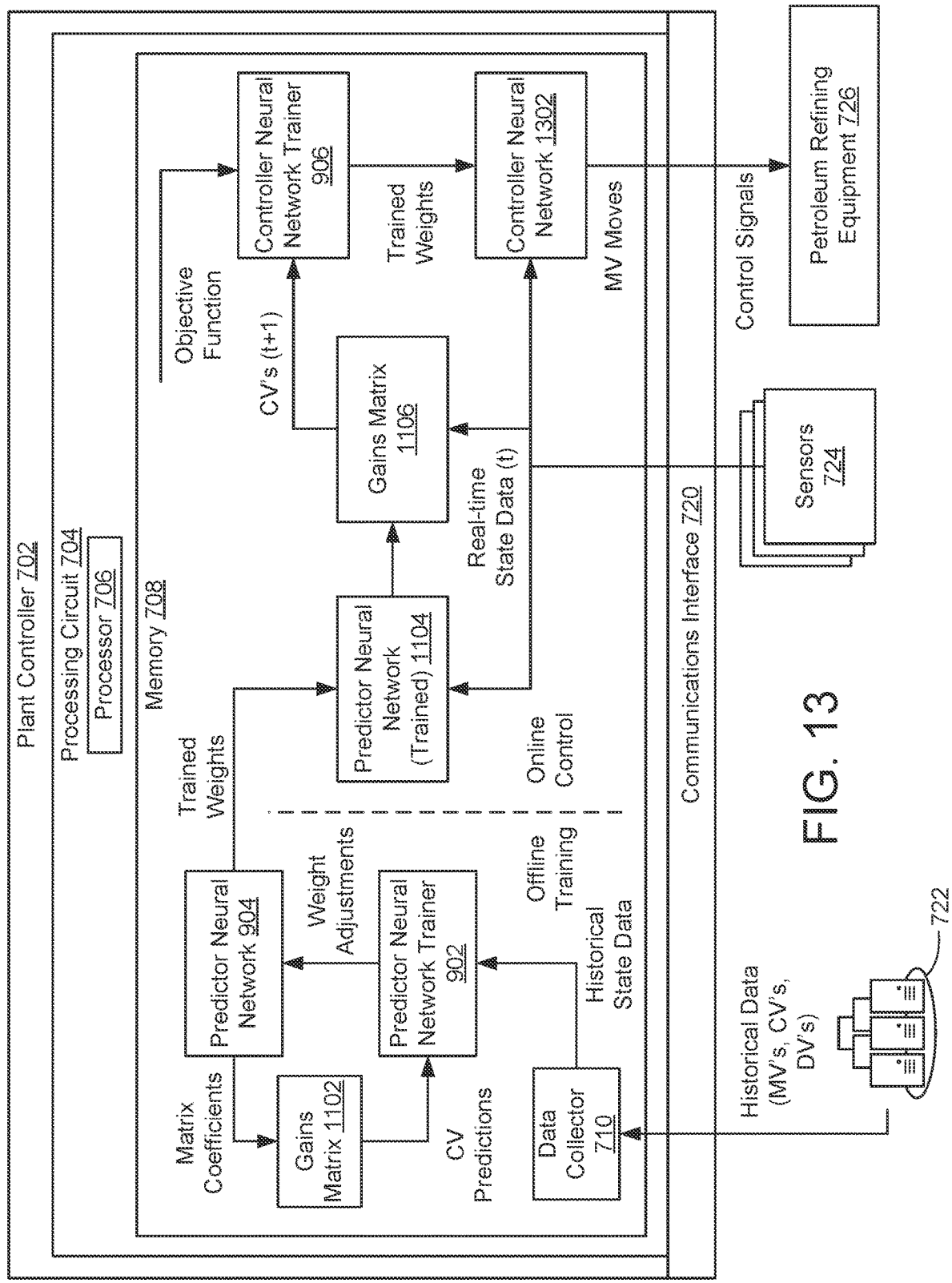
FIG. 13 is a block diagram of a plant controller using a predictor neural network to generate a gains matrix to train a controller neural network to determine MV moves, which can be implemented in the petroleum refinery system of FIG. 1, according to some embodiments.

Offline Trained Predictor Neural Network with Online Controller Neural Network Training Referring now to FIG. 13, a block diagram of another embodiment of plant controller 702 is shown. In the embodiment shown in FIG. 13, plant controller 702 may use predictor neural network 904 to generate gains matrix 1106 as previously described. However, instead of using gains matrix 1106 to perform model predictive control, gains matrix 1106 may be used to train a controller neural network 1302 for use in online control. Any components in FIG. 13 having the same reference numbers as components previously described may operate in the same or similar manner in the embodiment shown in FIG. 13, unless different operation is described below. For example, data collector 710 is shown providing historical data to predictor neural network trainer 902, which operates to train predictor neural network 904 to produce gains matrix 1102. These steps may be performed offline as previously described until predictor neural network 904 is trained sufficiently for online control. Once sufficiently trained, predictor neural network 904 may become predictor neural network (trained) 1104 or may provide the trained weights as an input to predictor neural network (trained) 1104.

During online control, predictor neural network (trained) 1104 may be used to generate gains matrix 1106 as a function of real-time state data. As described above, gains matrix 1106 may be configured to predict the values of the CV's at time step t+1 as a function of the MV's and/or real-time state data at time step t. Gains matrix 1106 may be used by controller neural network trainer 906 to train controller neural network 1302.

Controller neural network trainer 906 may be configured to train controller neural network 1302 by performing a training process similar to the training process described with reference to FIG. 9. For example, controller neural network trainer 906 may be configured to adjust the weights of controller neural network 1302 such that the values of the MV's or MV moves output by controller neural network 1302 optimize an objective function. In some embodiments, controller neural network trainer 906 uses gains matrix 1106 to predict the values of the CV's that will result from a given set of MV's output by controller neural network 1302 and uses the predicted values of the CV's to evaluate the objective function. Controller neural network trainer 906 may continue adjusting the weights of controller neural network 1302 until the MV's output by controller neural network 1302 result in values of the CV's that optimize the objective function over a given time period. Once trained, controller neural network 1302 can then be used to generate MV moves for time step t+1 as a function of the real-time state data at time step t.

Figure 14:
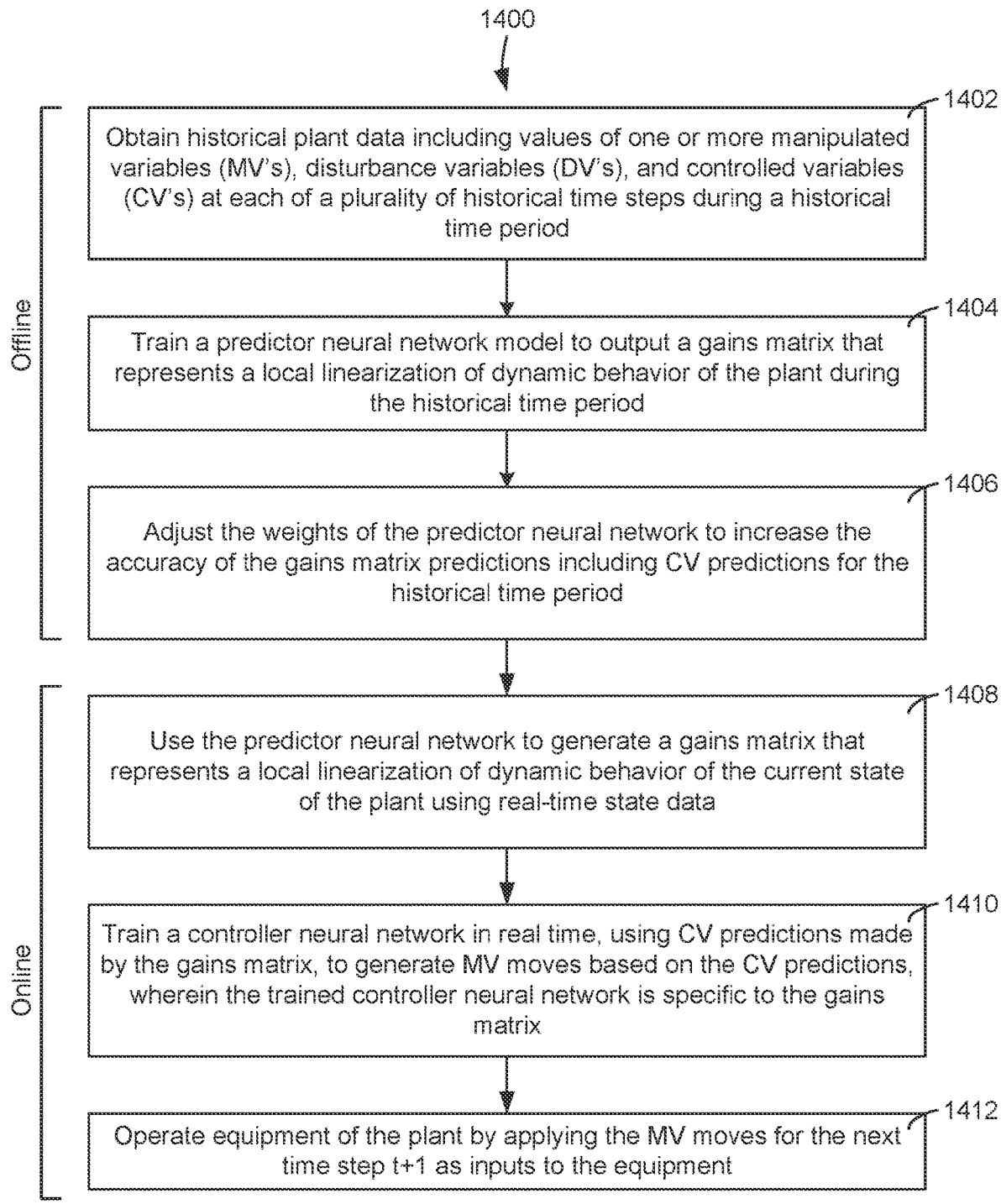
FIG. 14 is a flow diagram of a process for using a predictor neural network to generate a gains matrix to train a controller neural network to determine MV moves, which can be performed by the plant controller of FIG. 13, according to some embodiments.

Referring now to FIG. 14, a flow diagram of a process 1400 for training a controller neural network using a single gains matrix and using the controller neural network to operate equipment is shown, according to some embodiments. Process 1400 may be performed by any of the processing circuitry described herein, such as plant controller 702. In some embodiments, process 1200 is at least partially performed by plant controller 702 as described above with reference to FIG. 13.

Process 1400 is shown to include obtaining historical plant data including values of one or more manipulated variables (MV's), disturbance variables (DV's), and controlled variables (CV's) (step 1402). Data collector 710 may be configured to receive the historical plant data from database 722. In some embodiments, the data includes MV's, DV's, and/or CV's for one or more historical time periods (e.g., historical states) of the plant (e.g., operation of system 100).

In some embodiments, the MV's may include temperature severity of the FCCU 116. Temperature severity can include the temperature inside of reactor 208, the temperature of the feed entering reactor 208, the temperature of the feed during the chemical reaction, the temperature of the feed after pre-heating, the temperature of the feed prior to pre-heating, or a combination thereof. In some embodiments, the CV acting as the volume gain of the FCCU could include individual volume values for each of the outputs of the FCCU which could be used to calculate volume gain.

Process 1400 is shown to include training a predictor neural network model to output a gains matrix that represents a local linearization of dynamic behavior of the plant during the historical time period (step 1404) and adjusting the weights of the predictor neural network to increase the accuracy of the gains matrix predictions including CV predictions for the historical time period (step 1406). Predictor neural network trainer 902 may be configured to adjust the weights of predictor neural network 904 to ensure the gains matrix 1102 generated by predictor neural network 904 accurately predicts values of the CV's in the historical data set.

Process 1400 is shown to include using the predictor neural network to generate a gains matrix that represents a local linearization of dynamic behavior of the current state of the plant using real-time state data. Once predictor neural network (trained) 1104 is trained, predictor neural network (trained) 1104 can receive real-time state data (e.g., data relating to the operation of the plant) via sensors 724 and generate a gains matrix 1106 based on that data. The linearized representation of the current state can be used to predict future CV's (e.g., CV's for t+1, etc.), which can be provided to optimizer 718.

Process 1400 is shown to include training a controller neural network in real-time, using CV predictions made by the gains matrix, to generate MV moves based on the CV predictions, wherein the trained controller neural network is specific to the gains matrix (step 1410). For example, step 1410 may include adjusting the weights of controller neural network 1302 such that the values of the MV's or MV moves output by controller neural network 1302 optimize an objective function. In some embodiments, controller neural network trainer 906 uses gains matrix 1106 to predict the values of the CV's that will result from a given set of MV's output by controller neural network 1302 and uses the predicted values of the CV's to evaluate the objective function. Controller neural network trainer 906 may continue adjusting the weights of controller neural 1302 until the MV's output by controller neural network 1302 result in values of the CV's that optimize the objective function over a given time period. Once trained, controller neural network 1302 can then be used to generate MV moves for time step t+1 as a function of the real-time state date at time step t.

Process 1400 is shown to include operating equipment of the plant by applying the MV moves for the next time step t+1 as inputs to the equipment (step 1412). Step 1412 may include using the values of the MV's at time step t+1 as inputs to the equipment or using the values of the MV's at time step t+1 to generate control signals for the equipment.

Offline Controller Neural Network Training Based on Multiple Gains Matrices

Figure 15:
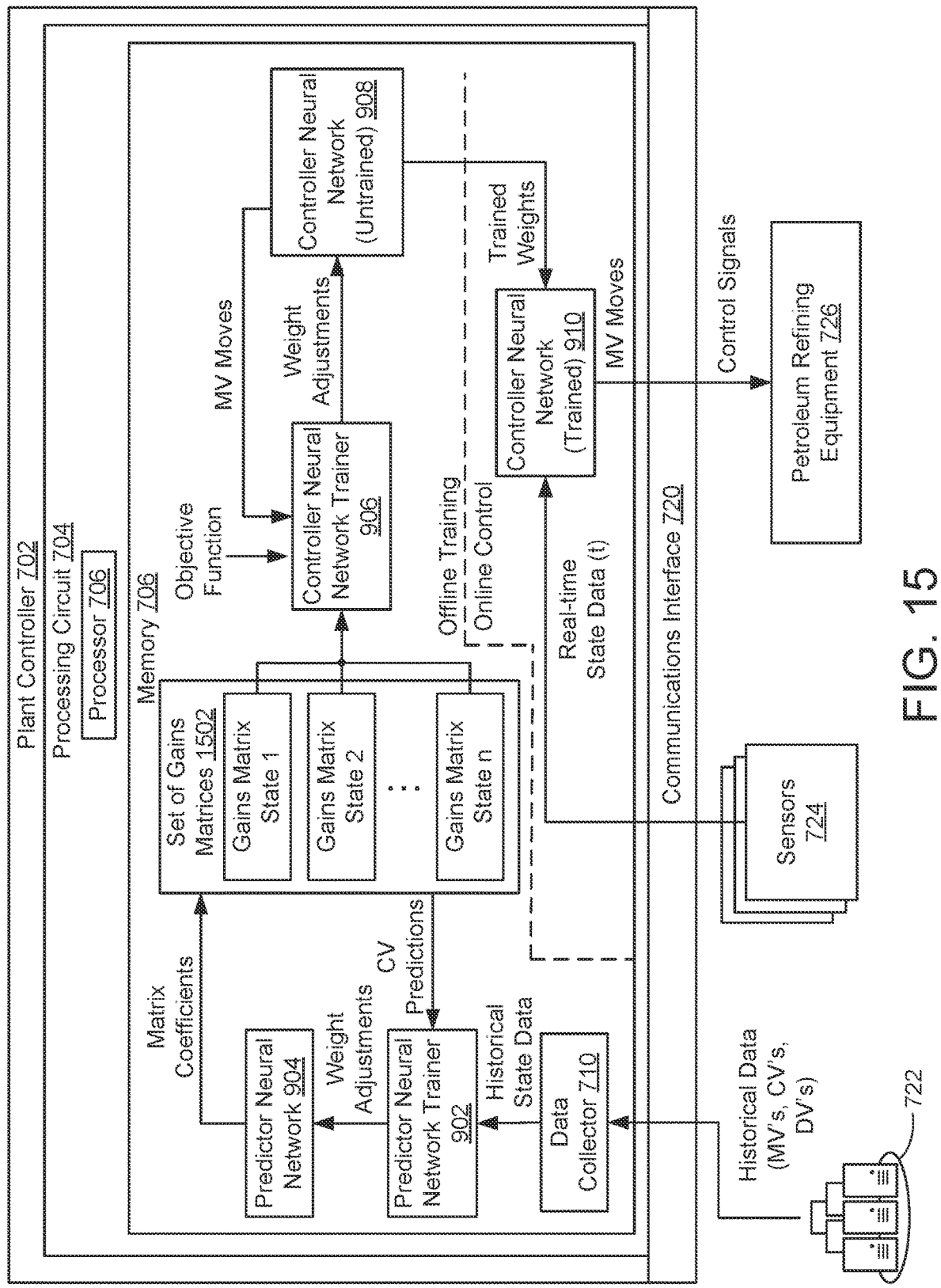
FIG. 15 is a block diagram of a plant controller using multiple gains matrices to train a controller neural network to determine MV moves, which can be implemented in the petroleum refinery system of FIG. 1, according to some embodiments.

Referring now to FIG. 15, a block diagram of a process for performing online control based on multiple gain matrices is shown, according to some embodiments. Memory 708 is shown to include data collector 710, predictor neural network trainer 902, predictor neural network 904, set of gains matrices 1502, controller neural network trainer 906, controller neural network (untrained) 908, controller neural network (trained) 910. Any components in FIG. 15 having the same reference numbers as components previously described may operate in the same or similar manner in the embodiment shown in FIG. 15, unless different operation is described below.

The embodiment illustrated in FIG. 15 may be similar to the embodiment illustrated in FIG. 13, with the exception that controller neural network 908, 910 is trained using multiple different gains matrices instead of a single gains matrix. The steps performed by predictor neural network trainer 902 to train predictor neural network 904 may be the same as previously described. Once trained, predictor neural network 904 can be used to generate a set of gains matrices 1502. Each of the gains matrices 1502 may represent a different linearization of dynamic behavior of the plant (e.g., localized to a particular episode of the historical data) and may be generated using the same or similar process used to generate gains matrix 1106 as previously described. The steps performed to generate the gains matrices 1502 can be repeated multiple times for different sets of historical data to generate a gains matrix for each set of the historical data (e.g., for multiple different episodes of the historical data).

Controller neural network trainer 906 can then use the set of gains matrices 1502 to train controller neural network (untrained) 908. The steps performed to train controller neural network (untrained) 908 may be similar to the embodiment described with reference to FIG. 13. However, instead of using a single gains matrix to predict the values of the CV's or CV moves that will result from a each set of MV's or MV moves generated by controller neural network (untrained 908). Each set of MV's or MV moves generated by controller neural network (untrained) 908 may be associated with a particular episode of the training data, specifically the episode of training data used by controller neural network (untrained) 908 to generate that set of MV's or MV moves. The gains matrix generated for that same episode may then be used to predict the values of the CV's or CV moves that will result from the MV's or MV moves associated with that same episode. The entire set of predicted values of the CV's or CV moves (i.e., across all of the episodes) may then be used to evaluate objective function to determine how well the various sets of MV's or MV moves optimize the objective function across all of the episodes.

Advantageously, using all of the gains matrices 1502 to train controller neural network 908, 910 may result in a controller neural network 908, 910 that is not specific to a single gains matrix or linear behavior of the plant, but rather can generate appropriate values of the MV's for any real-time state data or any linear behavior of the plant. In other words, controller neural network 908, 910 can be trained to output values of the MV's or MV moves for any value of the real-time state data corresponding to any of the divergent linear behaviors of the plant, not only values of the real-time state data that correspond to the same linear behavior of the plant as the episode of historical data used to generate a particular gains matrix. Accordingly, this allows a single controller neural network (untrained) 908 to be trained offline and then used as controller neural network (trained) 910 during online control rather than needing to generate a different instance of controller neural network (trained) 910 for each gains matrix and/or each episode of the historical data. In some embodiments, controller neural network (trained) 910 can receive one or more real time gains matrices generated by predictor neural network 904 based on the real time state data. The real-time gains matrix may inform controller neural network (trained) 910 of the current (e.g., real-time, etc.) linearized dynamics. Under this scheme, the real-time gains matrix may also be and input to controller neural network (untrained) 908 during training.

Figure 16:
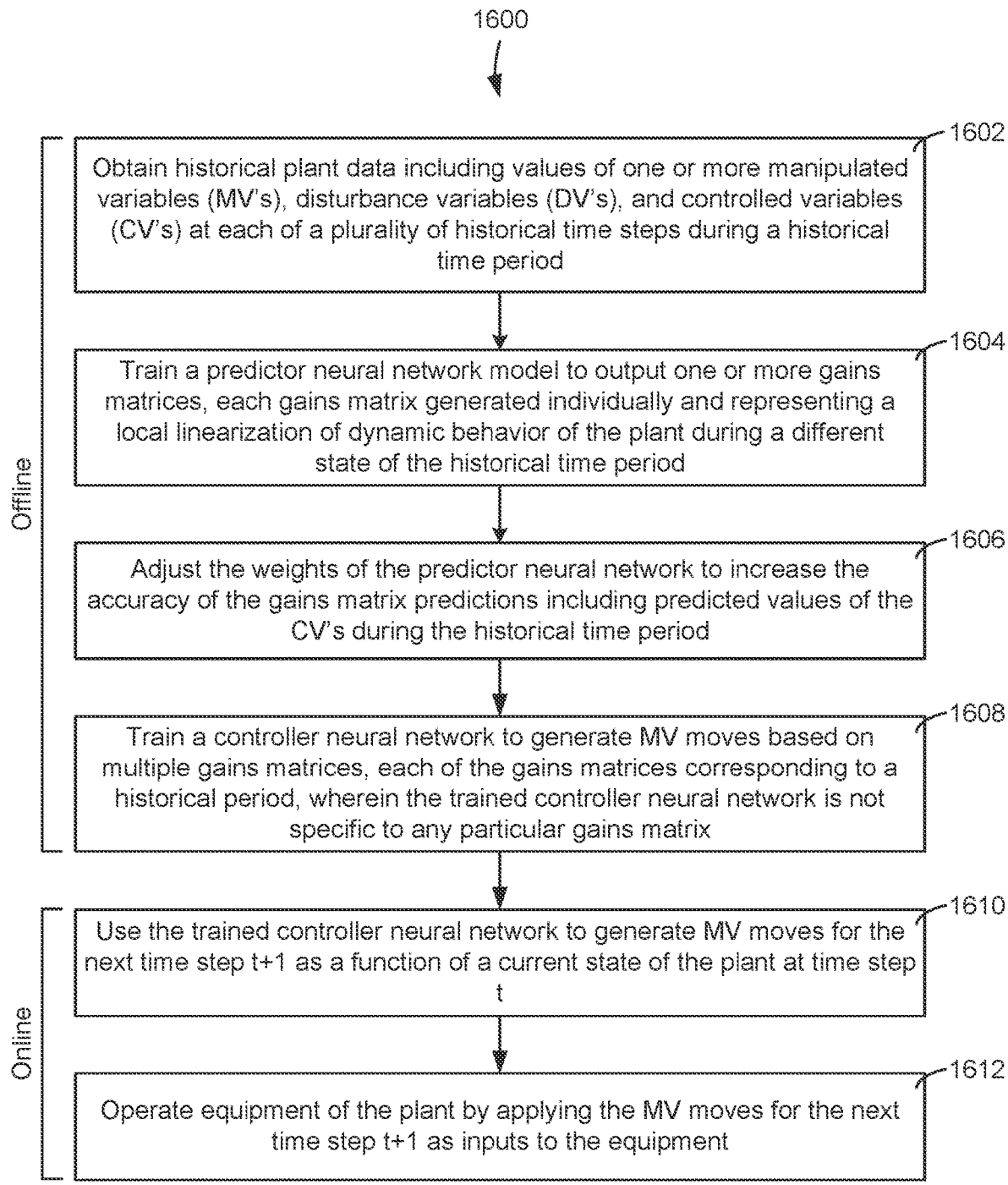
FIG. 16 is a flow diagram of a process for using multiple gains matrices to train a controller neural network to determine MV moves, which can be performed by the plant controller of FIG. 15, according to some embodiments.

Referring now to FIG. 16, a flow diagram of a process 1600 for performing online control based on multiple gain matrices is shown, according to some embodiments. Process 1600 may be performed by any of the processing circuitry described herein, such as plant controller 702. In some embodiments, process 1200 is at least partially performed by plant controller 702 as described above with reference to FIG. 15.

Process 1600 is shown to include obtaining historical plant data including values of one or more manipulated variables (MV's), disturbance variables (DV's), and controlled variables (CV's) (step 1602). Data collector 710 may be configured to receive the historical plant data from database 722. In some embodiments, the data includes MV's, DV's, and/or CV's for one or more historical time periods (e.g., historical states) of the plant (e.g., operation of system 100). Data collector 710 may be configured to receive the historical plant data from database 722. In some embodiments, the data includes MV's, DV's, and/or CV's for one or more historical time periods (e.g., historical states) of the plant (e.g., operation of system 100). For example, at the time step t (e.g., Friday @ 10:15 AM, etc.) the historical data may indicate that the temperature of the feed entering reactor 208 after being pre-heated is 460° C. (MV), the feed prior to entering heat source 202 to be pre-heated is 400° C. (DV), the temperature within reactor 208 (i.e., the temperature relating to the reactor severity, etc.) is 535° C. (MV), and the intended volume gain of FCCU 116 is 2,000 m$^3$ (TV) to optimize volume gain (CV)—the CV potentially being based on any number of factors, such as a ratio of the total amount of light hydrocarbons per the total incoming feed (e.g., 0.6, 0.7, etc.), the monetary value associated with each light hydrocarbon product, the production efficiency of each hydrocarbon product compared to one another, the production efficiency at a given reactor severity, or any combination thereof.

Process 1600 is shown to include training a predictor neural network model to output one or more gains matrices, each gains matrix generated individually and representing a local linearization of dynamic behavior of the plant during a different state or episode of the historical time period (step 1604). Process 1600 may include adjusting the weights of the predictor neural network to increase the accuracy of the gains matrix predictions including predicted values of the CVs during the historical time period (step 1606). In some embodiments, predictor neural network 904 is configured to generate a gains matrix for one or more sets of historical data. For example, each set of historical data may correspond to a particular episode of the historical data during within which the dynamic behavior of the plant is substantially linear. Each set of historical data may be used to generate a gains matrix that represents the localized linear behavior of the plant during the corresponding time period or episode. The set of gains matrices (e.g., set of gains matrices 1502) may represent a variety of different linear behaviors of the plant, giving the controller neural network (untrained) 908 more training data from a more diverse range of plant behaviors.

Process 1600 is shown to include training a controller neural network to generate MV moves based on multiple gains matrices, each of the gains matrices corresponding to a historical period, wherein the trained controller neural network is not specific to any particular gains matrix (step 1608). In some embodiments, the controller neural network (trained) 910 is trained using some or all of the gains matrices in the set of gains matrices 1502. This may allow controller neural network (trained) 910 to learn multiple types of dynamic behavior that the plant experiences. In other words, controller neural network (trained) 910 is trained using a diverse set of gains matrices, resulting in a controller neural network (trained) 910 that can be used for any state of the plant rather than only states that fall within a particular type of linear behavior.

Process 1600 is shown to include using the trained controller neural network to generate MV moves for the next time step t+1 as a function of a current state of the plant at time step t (step 1610). In some embodiments, controller neural network (trained) 910 can input the real-time state data in the model generated by the neural network of controller neural network (untrained) 908 to determine the MV adjustments required to reach one or more predicted CV values.

Process 1600 is shown to include operate equipment of the plant by applying the MV moves for the next time step t+1 as inputs to the equipment (step 1612). In some embodiments, petroleum refining equipment 726 can include a mechanism (e.g., an actuator/valve assembly, a pump device, etc.) that, when the control signals are received, adjust the flow of catalyst into reactor 208, thus adjusting the reactor severity in FCCU 116 (e.g., when reactor severity is an MV, etc.).

In some embodiments, one or more reactor severity control mechanisms (e.g., modules, components, etc.) are located proximate to FCCU 116 or upstream/downstream of FCCU 116 to adjust the reactor severity within reactor 208. For example, one reactor severity control mechanism that can adjust the reactor severity within FCCU 116 at least in part can be a valving system that adjusts the flow of catalyst into riser 204. In some embodiments, another reactor severity control mechanism can include a valving system controlling the amount of feed entering FCCU 116. In some embodiments, another reactor severity control mechanism is a heat source 202 that pre-heats the incoming feed. The reactor severity control mechanisms may be part of petroleum refining equipment 726 described below, and may be configured to receive control signals from plant controller 702 to adjust one or more MV's of the plant (e.g., to increase the volume gain of FCCU 116, etc.).

In other embodiments, the control signals may be sent to heat source 202 to preheat the incoming feed prior to the feed entering FCCU 116. In some embodiments, the reactor severity is the MV adjusted to reach the predicted CV, and the reactor severity is based at least in part on the incoming feed. In other embodiments, the control signals can be sent to any number of equipment configured to affect the reactor severity, such as the mechanisms described in the example above, a control system for mixing parts of the catalyst (e.g., to affect the quality of the catalyst, thereby affecting the reactor severity, etc.), or a combination thereof.

Predictor Neural Network Training

Figure 17:
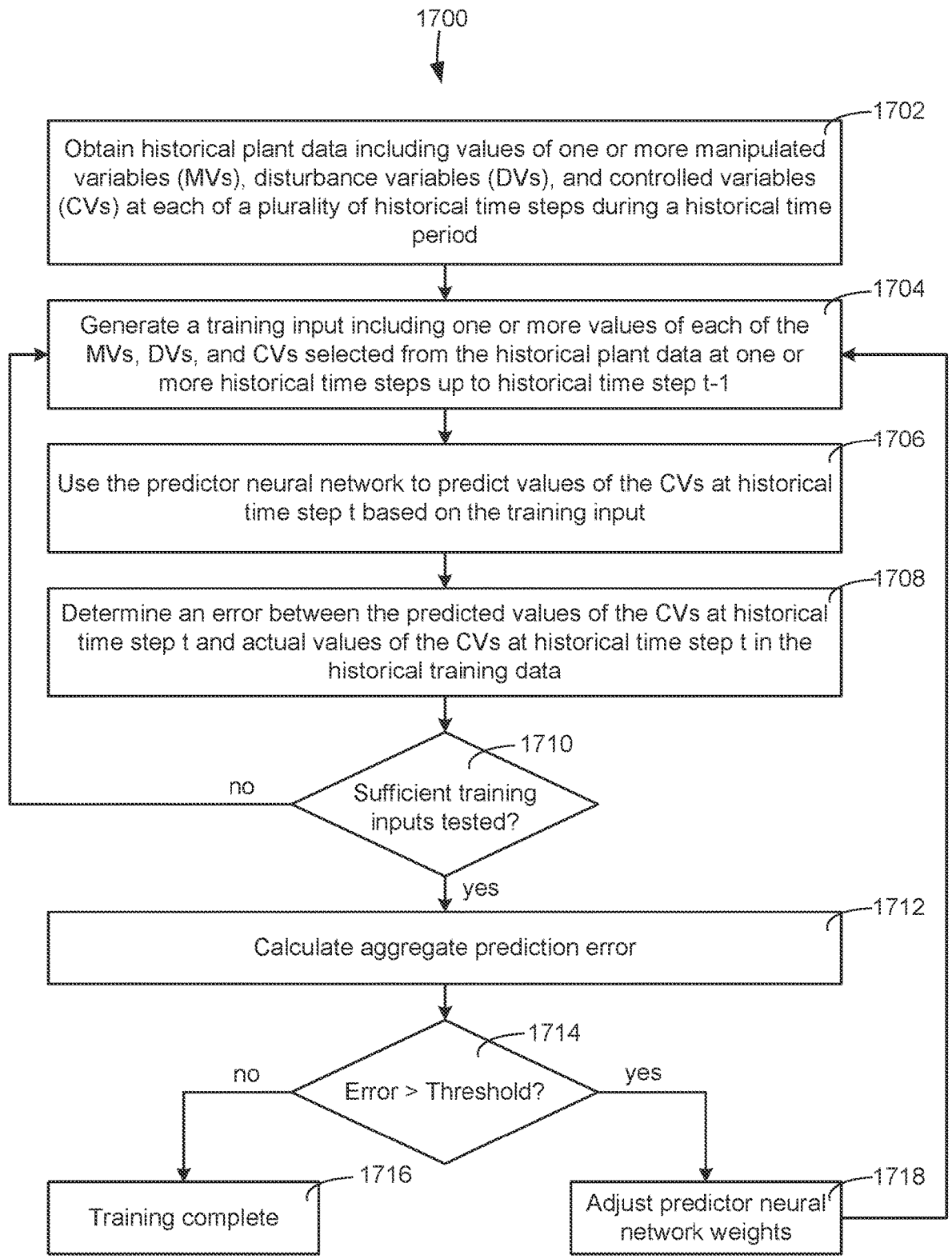
FIG. 17 is a flow diagram of a process for training a predictor neural network, which can be performed by the controllers of FIGS. 7-8, according to some embodiments.

Referring now to FIG. 17, a process 1700 for training a predictor neural network is shown, according to some embodiments. In some embodiments, process 1700 can be performed in place of or in addition to the processes described above to train the various predictor neural networks in FIGS. 9-16. Process 1700 may be performed by plant controller 702, or any of the other processing circuitry disclosed herein. Process 1700 is shown to include obtaining historical plant data including values of one or more manipulated variables (MV's), disturbance variables (DV's), and controlled variables (CV's) at each of a plurality of historical time steps during a historical time period (step 1702).

Process 1700 is shown to include generating a training input including one or more values of each of the MV's, DV's, and CV's selected from the historical plant data at one or more historical time steps up to historical time step t−1 (step 1704). The training input may include a vector of values for each of the MV's, DV's, and CV's (i.e., a time series of each variable including one or more time series values up to time step t−1), which could be provided in the form of a matrix or otherwise.

For example, the weights of predictor neural network 904 and/or bias vectors of predictor neural network 904 are initialized. After initialization, for each of a plurality of time steps, an input vector x is formed of values of CV's, MV's and/or DV's of time points t−T . . . t, and a desired output values vector y' is formed of the values of the controlled variables at time t+1. Predictor neural network 904 is applied to the input vector x and the resultant output vector y is compared to the desired output values vector y'. Based on a difference between the output vector y and the desired output values vector y', the weights of predictor neural network 904 are adjusted in a direction which reduces the difference. The magnitude of the difference is calculated using any suitable difference measure (e.g., absolute value, sum of squares, etc.). The forming of the vectors, applying predictor neural network 904, and adjusting the weights is repeated for many time points, such that predictor neural network 904 reliably models the operation of the system.

Process 1700 is shown to include using the predictor neural network to predict values of the CV's at historical time step t based on the training input (step 1706). In some embodiments, the predictor neural network is substantially similar or identical to predictor neural network 904. Predictor neural network 904 may generate a linear predictor which can include the predicted CV's of the current time step. In some embodiments, offline neural network can analyze the CV's, MV's, and DV's all for a current time step and predict the CV's for a future time step.

Process 1700 is shown to include determining an error between the predicted values of the CV's at historical time step t and actual values of the CV's at historical time step tin the historical training data (step 1708). This may be performed by implementing a certain error threshold (e.g., 5% 20%, etc.) such that if the predicted CV is within that error threshold, the prediction is considered accurate, and if the predicted CV is outside of that error threshold, the prediction is considered inaccurate. Predictor neural network 904 may require a certain subset of CV predictions to be "accurate" prior to determining that the training of predictor neural network 904 is complete. Other methods for determining the error may be considered, such as determining if the answer is within a predetermined range of values or allowing supervised learning from a technician/engineer.

Process 1700 is further shown to include determining if a sufficient number of training inputs have been tested (step 1710) In some embodiments, predictor neural network 904 is instructed to process a certain number of states, generate a certain number of accurate predictions, or a combination thereof. If this threshold has not been met, process 1700 repeats steps 1704-1708 until efficient training inputs have been tested. Once this threshold is met, process 1700 proceeds to step 1712 discussed below.

In the above example, determining the error may be performed in a manner similar to the training of predictor neural network 904, but instead of adjusting the weights of predictor neural network 904 in response to the comparison of the output vector y and the desired output values vector y', an average error equal to the difference between the vectors y, y' is calculated over one or more time points and the average is displayed to a human user and/or is compared to a threshold. If the average difference is smaller than the threshold, the predictor is considered ready for operation. Otherwise, one or more parameters of the neural network may be adjusted, such as the number of layers, the specific controlled, manipulated and/or disturbance variables used, the size of the intermediary vectors h1, h2, h3, . . . hn and/or the duration T of the time period used to form the input vector x. The training of predictor neural network 904 may then be repeated. In some embodiments predictor neural network 904 processes to values up to time t in order to estimate values of the CV's at time t+1. In other embodiments, predictor neural network 904 is applied to a vector including values of MV's at time t+1 in predicting the CV's at time t+1, so as to take into account the most recent values of the MV's.

Instead of the training based on each time point on its own, in some embodiments, the training of predictor neural network 904 is performed on sequences of time points together. For each sequence of time points, t1, t2, . . . tn, the forming of the vectors and applying of predictor neural network 904 in order to receive the values of the controlled variables, are performed for the first time point of the sequence t1. Then, instead of immediately adjusting the weights of predictor neural network 904 according to a comparison to a desired output values vector y', an input vector for the second time point t2 is created using the outputs of the predictor instead of the stored values from database 722, for the values of the controlled variables at time t1. This process is repeated until predicted values are calculated for time tn. Then, the predicted values for times t1, t2, . . . tn are compared to the stored values using a given metric and the neural network is adjusted accordingly.

In some embodiments, rather than predicting explicit values of CV's, predictor neural network 904 is trained, using any suitable method known in the art, to produce a distribution over different possibilities. For example, predictor neural network 904 may output at time point t the mean and covariance of a Gaussian distribution which reflects estimated posterior probabilities of controlled variable values in time point t+1. This allows modelling uncertainty in the behavior of the plant, to optionally be taken into account by plant controller 702.

Process 1700 is shown to include calculating aggregate prediction error (step 1712) and comparing it to a threshold (step 1714). In some embodiments, the aggregate prediction error is an error determination that takes into account several predictions made by predictor neural network 904. The aggregate prediction error could be an average of the errors resulting from each training input, an aggregate error, or any other metric. In some embodiments, the aggregate prediction error weights certain CV predictions over others based on user instruction. For example, it may be more important to accurately predict volume gain (a CV in one embodiment) than the flow rate to reactor 208 (another CV in the embodiment) during training of predictor neural network 904.

Other methods for comparing the aggregate prediction error to a threshold may be considered, such as determining if the error is within a predetermined range of value, determining if the error is off by a predetermined percentage or allowing supervised learning from a technician/engineer to make the decision. If the aggregate prediction error is outside of the acceptable threshold, the weights of predictor neural network 904 are adjusted (1718) and steps 1704-1714 are repeated. If the aggregate prediction error is within the acceptable threshold, the training of predictor neural network 904 is completed (1716).

Controller Neural Network Training

Figure 18:
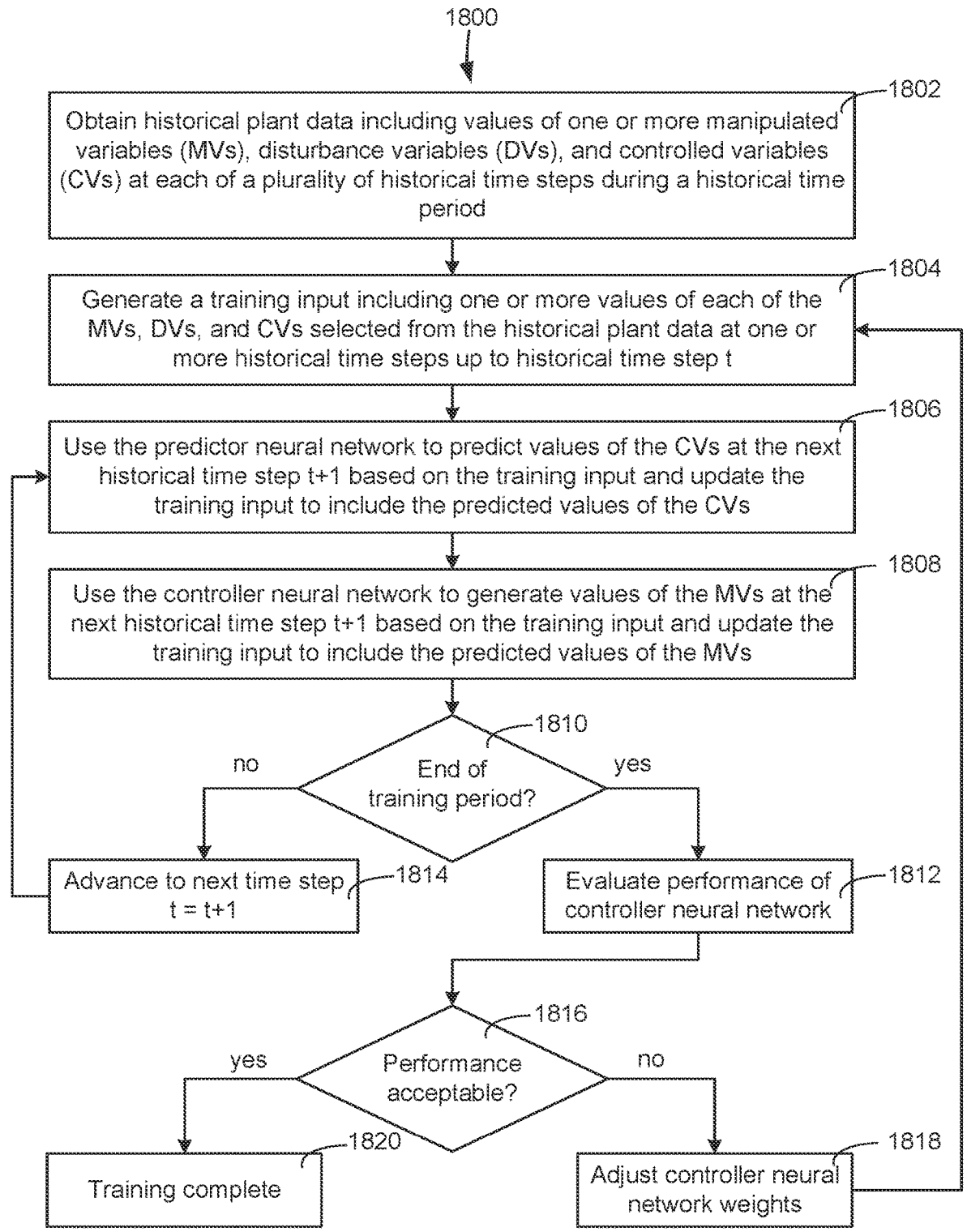
FIG. 18 is a flow diagram of a process for training a controller neural network, which can be performed by the controllers of FIGS. 7-8, according to some embodiments.

Referring now to FIG. 18, a process 1800 for training a controller neural network to generate MV's for given CV's is shown, according to some embodiments. In some embodiments, process 1700 can be performed in place of or in addition to the processes described above to train the various predictor neural networks in FIGS. 9-16. Process 1800 may be performed by plant controller 702, or any of the other processing circuitry disclosed herein. Process 1800 is shown to include obtaining historical plant data including values of one or more manipulated variables (MV's), disturbance variables (DV's), and controlled variables (CV's) at each of a plurality of historical time steps during a historical time period (step 1802).

Process 1800 is shown to include generating a training input including one or more values of each of the MV's, DV's, and CV's selected from the historical plant data at one or more historical time steps up to historical time step t (step 1804). In some embodiments, the training input may be similar to the historical states that can be used to train predictor neural network 904. The training input may also include target values for the CV's (i.e., setpoints or setpoint ranges).

Process 1800 is shown to include using the predictor neural network to predict values of the CV's at the next historical time step t+1 based on the training input and update the training input to include the predicted values of the CV's (step 1806). Predictor neural network 904 may predict the CV's for the next historical time step t+1 based on the training input, and include the predicted CV's for the future time step in the training input, which can subsequently be provided to controller neural network 1302.

Process 1800 is shown to include using the controller neural network to predict values of the MV's at the next historical time step t+1 based on the training input and update the training input to include the predicted values of the MV's (step 1808). Once controller neural network 1302 receives the training input, controller neural network 1302 can make MV predictions based on the predicted CV prediction made by predictor neural network 904. These predicted MV's (and any other relevant data (e.g., TVs)) can be added to the training input, such that all of the predictions for time step t+1 are included within the training input.

Process 1800 is shown to include determining if the training period has ended (step 1810). The training period may be based on a certain amount of predictions being made, a certain number of historical data sets/states/episodes being analyzed, data for a certain number of future time steps being predicted, or any combination thereof. If training has not been completed, process 1800 advances to the next time step t+1 (step 1814) and steps 1806-1808 are repeated until training is complete.

Once training has been completed, the performance of controller neural network 1302 is evaluated (step 1812) to determine whether the performance of controller neural network 1302 is acceptable (step 1816). In some embodiments, this step includes comparing the predicted CV's to the target values of the CV's for the corresponding time steps to calculate an average or aggregate error, or putting the predicted values of the CV's into an objective function and calculating the value of the objective function. In some embodiments, the evaluation also considers values of the MV's and/or includes penalties for the MV's deviating from predetermined ranges. If the performance of controller neural network 1302 is evaluated and considered not acceptable, process 1800 repeats steps 1804-1812 until the performance is acceptable. When the performance of controller neural network 1302 is considered acceptable, the training is complete (step 1820).

Inferentials

In some embodiments, one or more inferentials may be developed to generate, predict, calculate, or otherwise determine the values of variables as a function of other variables or data inputs (e.g., to convert a slow sampled process signal to a fast sampled variable) in oil refinery control systems. Inferentials may use one or more variable types (e.g., MV's, CV's, DV's, etc.) as inputs and may produce one or more of the same or different variable types as outputs. Inferentials may also be used in the objective function.

As described herein, any of the values of CV's, MV's and DV's can be predicted, calculated, inferred, estimated, or interpolated at any point in real-time and/or via querying historical time data. For example, a predictive model (e.g., neural network, etc.) is configured receive multiple data points (e.g., data samples, etc.) of an MV at a rate that is lower than preferred. As such, the predictive model makes an inference as to the value of the MV based on the inferential functionality performed by the predictive model. In some embodiments, the inferential functionality is performed by using linear regression, nonlinear regression weighted interpolation, extrapolation, neural networks, or any combination thereof.

In some embodiments, the sampling of CV values is slow such that inferential functionality is used to infer a value of the CV in between samples. A neural network currently implemented in the system (e.g., controller neural network 910, etc.) or a separate neural network can be configured to use regression analysis to infer the value of the CV in between samples. Of course, this is merely exemplary and any of the values MV's, CV's, and DV's, may be determined based on inferences made by one or more models performing regression analysis.

Typical inferentials for FCCUs and their inputs include but are not limited to: Debutanizer Bottoms RON-ROT, Btms Temp, Btms Pressure, Main Frac OVHD Pressure Compensated Temp, Cat Circ, Straight Run Naphtha Feed, Main Frac OVHD Temp, Naphtha Product Rate, Debut Tray 1 TempBB C5+ Content—Olefin flow, Main Frac OVHD Pressure, Debut Tray 9 Temp, HCO P/A, ROT, COT. Typical inferentials for FCCUs and their inputs may also include Cat Gas RVP—Debut Tray 9 Temp, Main Frac OVHD Temp, Olefin flow, total cat gas flow, COT, Top PA Draw Temp, Riser Top Temperature, Primary Absorber Feed, DeC4 BTMS Temp, DeC4 OH Temp. Typical inferentials for FCCUs and their inputs may also include Cat Gas T90—Main Frac OVHD Temp, HCO P/A, Debut OVHD Pressure, Total feed, Debut Tray 9 Temp.

Additionally, typical inferentials for FCCUs and their inputs may also include LCO T90—Total LCO flow, slurry to storage flow, LCO Draw Temp, Main Frac OVHD Temp, HCO P/A, Main Frac OVHD Pressure. Typical inferentials for FCCUs and their inputs may also include LCO Flash—COT, Total feed, Total LCO flow, LCO Draw Temp. Typical inferentials for FCCUs and their inputs may also include Saturated C3s—Feed Preheat Temp, Riser Top Temperature, LPG to Merox, DeC3 BTMS Temp, DeC3 OH Temp. Typical inferentials for FCCUs and their inputs may also include Unsaturated C3s—Feed Preheat Temp, Riser Top Temperature, LPG to Merox, DeC3 BTMS Temp, DeC3 OH Temp. Typical inferentials for FCCUs and their inputs may also include Saturated C4s—Feed Preheat Temp, Riser Top Temperature, Primary Absorber Feed, DeC4 BTMS Temp, DeC4 OH Temp.

Additionally, typical inferentials for FCCUs and their inputs may also include Unsaturated C4s—Feed Preheat Temp, Riser Top Temperature, Primary Absorber Feed, DeC4 BTMS Temp, DeC4 OH Temp. Typical inferentials for FCCUs and their inputs may also include Cat Gas FBP—Main Frac OH Pressure, Main Frac OH temperature, Top PA Draw Temp, LCO Stripper Bottoms Temp, Riser Top Temperature, Primary Absorber Feed, DeC4 BTMS Temp, DeC4 OH Temp. Typical inferentials for FCCUs and their inputs may also include DeC4 OH C5s—Feed Preheat Temp, Top PA Draw Temp, Riser Top Temperature, Primary Absorber Feed, DeC4 BTMS Temp, DeC4 OH Temp. Typical inferentials for FCCUs and their inputs may also include Slurry Gravity—Feed Preheat Temp, Riser Top Temperature, Slurry Product Rate, Feed/Slurry Exchanger Feed Bypass Temp.

Additionally, typical inferentials for FCCUs and their inputs may also include iC4s—Feed Preheat Temp, Riser Top Temperature, Primary Absorber Feed, DeC4 BTMS Temp, DeC4 OH Temp. Typical inferentials for FCCUs and their inputs may also include nC4s—Feed Preheat Temp, Riser Top Temperature, Primary Absorber Feed, DeC4 BTMS Temp, DeC4 OH Temp. Typical inferentials for FCCUs and their inputs may also include Octane—Feed Preheat Temp, Riser Top Temperature, Gasoline Product Rate, Dry Gas Product Rate, DeC4 BTMS Temp. Typical inferentials for FCCUs and their inputs may also include LCO 90%—Total LCO flow, LCO stripper bottoms temp, Feed Flow.

In some embodiments, one or more reactor severity control mechanisms (e.g., modules, components, etc.) are located proximate to FCCU 116 or upstream/downstream of FCCU 116 to adjust the reactor severity within reactor 208. For example, one reactor severity control mechanism that can adjust the reactor severity within FCCU 116 at least in part can be a valving system that adjusts the flow of catalyst into riser 204. In some embodiments, another reactor severity control mechanism can include a valving system controlling the amount of feed entering FCCU 116. In some embodiments, another reactor severity control mechanism is a heat source 202 that pre-heats the incoming feed. The reactor severity control mechanisms may be part of petroleum refining equipment 726 described below, and may be configured to receive control signals from plant controller 702 to adjust one or more MV's of the plant (e.g., to increase the volume gain of FCCU 116, etc.).

In some embodiments, the term "constrained variable" refers to at least one of MV's and DV's. A constrained variable may be any variable that is constrained by the system, and may even include CV's. In general a constrained variable refers to a variable that is constrained (e.g., via a penalty in an objective function, etc.).

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A control system for automatic operation of a fluid catalytic cracking unit, the control system comprising:
    a reactor severity control device operable to modulate a temperature affecting volume gain within the fluid catalytic cracking unit; and
    a controller comprising a processing circuit configured to:
        calculate the volume gain within the fluid catalytic cracking unit by comparing a volume based on one or more input oil feeds to the fluid catalytic cracking unit to a volume of one or more output oil products of the fluid catalytic cracking unit;
        use a neural network model to generate a target severity predicted to optimize the volume gain within the fluid catalytic cracking unit; and
        operate the reactor severity control device using the target severity to modulate the temperature affecting the volume gain within the fluid catalytic cracking unit.

2. The control system of claim 1, wherein:
    the reactor severity control device is configured to modulate the temperature affecting the volume gain by controlling a catalyst reaction within a reactor of the fluid catalytic cracking unit within which the one or more input oil feeds are converted into the one or more output oil products; and
    the temperature affecting the volume gain within the fluid catalytic cracking unit is a reactor temperature within the reactor.

3. The control system of claim 1, wherein:
    the reactor severity control device is a heating element configured to apply heat to a feed of one or more of the input oil feeds before the one or more of the input oil feeds enter the fluid catalytic cracking unit; and
    the temperature affecting the volume gain within the fluid catalytic cracking unit is a preheat temperature of the one or more input oil feeds.

4. The control system of claim 1, wherein the processing circuit is configured to:
    use the neural network model to predict a volume of each output oil product of the one or more output oil products predicted to result from the target severity;
    calculate a total predicted output volume of the one or more output oil products by summing the volume of each output oil product; and
    calculate the volume gain within the fluid catalytic cracking unit as a function of the total predicted output volume.

5. The control system of claim 1, wherein:
    generating a target severity predicted to optimize the volume gain further comprises providing a penalty separate from the volume gain, the penalty defined as a function of a constrained variable affected by the control system relative to a threshold value of a constraint that applies to the constrained variable; and
    the processing circuit is configured to use the neural network model predict a value of the constrained variable predicted to result from the target severity and calculate a value of the penalty as a function of the value of the constrained variable.

6. The control system of claim 1, wherein the processing circuit is configured to train the neural network model during an offline training period using historical plant data comprising at least one of:
    one or more manipulated variables provided as inputs to equipment of the fluid catalytic cracking unit;
    one or more controlled variables affected by operating the equipment of the fluid catalytic cracking unit; or
    one or more disturbance variables that affect the one or more controlled variables but are not directly controlled.

7. The control system of claim 1, wherein the neural network model comprises a predictor neural network model and the processing circuit is configured to train the predictor neural network model by:
    initializing the predictor neural network model with an initial set of weights;
    using the predictor neural network model to predict the volume of the one or more output oil products at a historical time step based on historical plant data for one or more previous time steps occurring prior to the historical time step;
    determining an error between predicted values of the volume of the one or more output oil products predicted by the predictor neural network model and actual values of the volume of the one or more output oil products defined by the historical plant data; and
    adjusting the weights of the predictor neural network model to reduce the error.

8. The control system of claim 1, wherein the neural network model comprises a predictor neural network model and controller neural network model, and the processing circuit is configured to train the controller neural network model by:
    initializing the controller neural network model with an initial set of weights;
    generating a time series of predicted values of the volume of the one or more output oil products using the predictor neural network model and the controller neural network model;
    calculating a value of an objective function based on the time series of predicted values of the volume of the one or more output oil products; and
    adjusting the weights of the controller neural network model to optimize the volume gain.

9. The control system of claim 8, wherein generating the time series of predicted values of the volume of the one or more output oil products using the predictor neural network model and the controller neural network model comprises:
    (i) using the predictor neural network model to predict the volume of the one or more output oil products at a historical time step based on a training input comprising historical plant data for one or more previous time steps occurring prior to the historical time step;
    (ii) updating the training input to include the volume of the one or more output oil products at the historical time step predicted by the predictor neural network model;
    (iii) using the controller neural network to determine the target severity at the historical time step based on the training input;
    (iv) updating the training input to include the target severity at the historical time step generated by the controller neural network model;
    (v) advancing the historical time step to a next time step within a training period; and
    (vi) repeating steps i-v until the historical time step reaches an end of the training period.

10. A method for automatic operation of a fluid catalytic cracking unit, the method comprising:
    calculating volume gain within the fluid catalytic cracking unit by comparing a volume of one or more input oil feeds to the fluid catalytic cracking unit to a volume of one or more output oil products of the fluid catalytic cracking unit;
using a neural network model to generate a target severity predicted to optimize the volume gain within the fluid catalytic cracking unit; and
operating a reactor severity control device using the target severity to modulate a temperature affecting the volume gain within the fluid catalytic cracking unit.

11. The method of claim 10, further comprising adjusting a catalyst reaction within the fluid catalytic cracking unit within which the one or more input oil feeds are converted into the one or more output oil products, wherein the temperature affecting the volume gain within the fluid catalytic cracking unit is a reactor temperature within the reactor.

12. The method of claim 10, further comprising heating a feed of one or more of the input oil feeds before the one or more of the input oil feeds enter the fluid catalytic cracking unit, wherein the temperature affecting the volume gain within the fluid catalytic cracking unit is a preheat temperature of the one or more input oil feeds.

13. The method of claim 10, further comprising:
using the neural network model to predict a volume of each output oil product of the one or more output oil products predicted to result from the target severity;
calculating a total predicted output volume of the one or more output oil products by summing the volume of each output oil product; and
calculating the volume gain within the fluid catalytic cracking unit as a function of the total predicted output volume.

14. The method of claim 10, wherein using the neural network model to generate the target severity predicted to optimize the objective function comprises generating a penalty within the objective function separate from the volume gain, the penalty defined as a function of a constrained variable affected by the control system relative to a threshold value of a constraint that applies to the constrained variable; and
the method further comprising using the neural network model predict a value of the constrained variable predicted to result from the target severity and calculate a value of the penalty as a function of the value of the constrained variable.

15. The method of claim 10, further comprising training the neural network model during an offline training period using historical plant data comprising at least one of:
one or more manipulated variables provided as inputs to equipment of the fluid catalytic cracking unit;
one or more controlled variables affected by operating the equipment of the fluid catalytic cracking unit; or
one or more disturbance variables that affect the one or more controlled variables but are not directly controlled.

16. The method of claim 10, further comprising:
initializing the predictor neural network model with an initial set of weights;
using the predictor neural network model to predict the volume of the one or more output oil products at a historical time step based on historical plant data for one or more previous time steps occurring prior to the historical time step;
determining an error between predicted values of the volume of the one or more output oil products predicted by the predictor neural network model and actual values of the volume of the one or more output oil products defined by the historical plant data; and
adjusting the weights of the predictor neural network model to reduce the error,
wherein the neural network model comprises the predictor neural network model.

17. The method of claim 10, further comprising:
initializing a controller neural network model with an initial set of weights;
generating a time series of predicted values of the volume of the one or more output oil products using a predictor neural network model and the controller neural network model;
calculating a value of the objective function based on the time series of predicted values of the volume of the one or more output oil products; and
adjusting the weights of the controller neural network model to optimize the objective function,
wherein the neural network model comprises the predictor neural network model and the controller neural network model.

18. A controller for controlling operation of a fluid catalytic cracking unit, the controller comprising a processing circuit configured to:
calculate the volume gain within the fluid catalytic cracking unit by comparing a volume of one or more input oil feeds to the fluid catalytic cracking unit to a volume of one or more output oil products of the fluid catalytic cracking unit;
use a predictive model to generate a target severity predicted to optimize the volume gain within the fluid catalytic cracking unit; and
operate a reactor severity control device using the target severity to modulate a temperature affecting the volume gain within the fluid catalytic cracking unit.

19. The controller of claim 18, wherein the processing circuit is configured to:
use the predictive model to predict a volume of each output oil product of the one or more output oil products predicted to result from the target severity;
calculate a total predicted output volume of the one or more output oil products by summing the volume of each output oil product; and
calculate the volume gain within the fluid catalytic cracking unit as a function of the total predicted output volume.

20. The controller of claim 18, wherein the predictive model is configured to perform model predictive control (MPC) to generate the target severity predicted to optimize the volume gain within the fluid catalytic cracking unit.

21. The controller of claim 18, wherein using the predictive model to generate the target severity comprises using an inferential to determine a value of a variable affecting the volume gain, the inferential comprising an inference that infers the value of the variable affecting the volume gain based on an inferential functionality performed by the predictive model.

22. The controller of claim 18, wherein using the predictive model to generate the target severity comprises:
receiving historical data comprising at least one of a feed rate for the one or more input oil feeds at a historical time step or a feed quality of the one or more input oil feeds at the historical time step; and
using the predictive model to predict the volume of the one or more output oil products at the historical time step based on the received historical data.

23. The controller of claim 22, wherein:
using the predictive model to generate the target severity comprises determining the target severity based on the volume of the one or more output oil products at the historical time step predicted by the predicted model; and operating the reactor severity control device comprises operating the reactor severity control device to adjust at least one of the feed rate or the feed quality to achieve the target severity in the fluid catalytic cracking unit.

* * * * *